(12) United States Patent
Tanaka et al.

(10) Patent No.: US 12,530,551 B2
(45) Date of Patent: Jan. 20, 2026

(54) READING APPARATUS AND READING APPARATUS CASE

(71) Applicant: CANON KABUSHIKI KAISHA, Tokyo (JP)

(72) Inventors: Yu Tanaka, Tokyo (JP); Mitsuhide Murofushi, Shizuoka (JP); Kenichi Fujii, Shizuoka (JP); Hiroki Kato, Shizuoka (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/882,007

(22) Filed: Sep. 11, 2024

(65) Prior Publication Data

US 2025/0094748 A1 Mar. 20, 2025

(30) Foreign Application Priority Data

Sep. 15, 2023 (JP) ................................. 2023-150108

(51) Int. Cl.
*G06K 7/10* (2006.01)

(52) U.S. Cl.
CPC ..... *G06K 7/10881* (2013.01); *G06K 7/10316* (2013.01)

(58) Field of Classification Search
CPC .................. G06K 7/10316; G06K 7/10881
USPC ...................................... 235/472.01
See application file for complete search history.

(56) References Cited

FOREIGN PATENT DOCUMENTS

| JP | 2015060442 A | 3/2015 | |
|---|---|---|---|
| WO | WO-2019026488 A1 * | 2/2019 | ............. H01Q 19/26 |

* cited by examiner

*Primary Examiner* — Toan C Ly
(74) *Attorney, Agent, or Firm* — Canon U.S.A., Inc., IP Division

(57) ABSTRACT

A reading apparatus includes an antenna element, a substrate including a ground plane and a communication circuit, and a housing. The housing has a plate-like shape having a length in a first direction that is shorter than a length in a second direction and a length in a third direction. The reading apparatus includes a parasitic element that is disposed apart from the substrate in the first direction and is disposed so as to overlap both of the antenna element and the ground plane when viewed in the first direction, the parasitic element resonating when the antenna element is excited. A length of the parasitic element in the second direction is shorter than ½ of a wavelength of an operation frequency that is used to transmit and receive the radio signal.

19 Claims, 16 Drawing Sheets

FIG. 2A
FIG. 2B
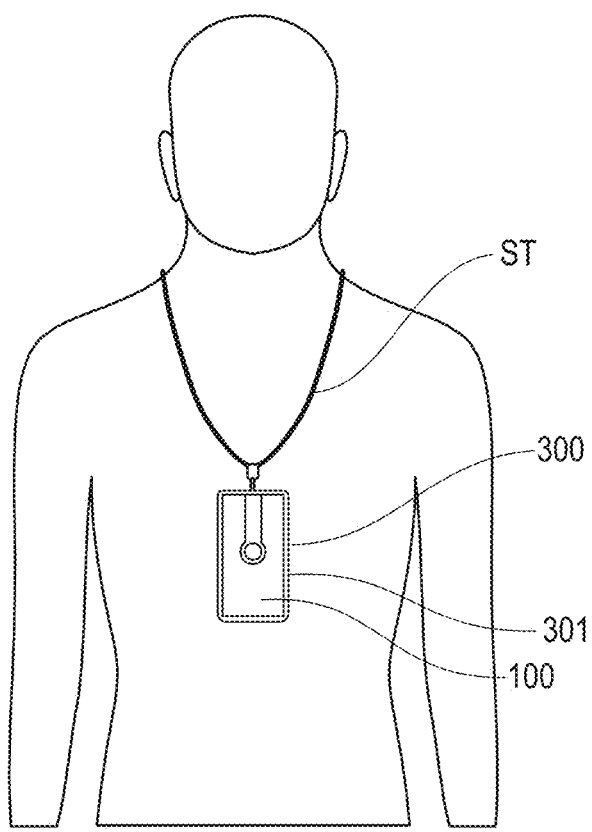
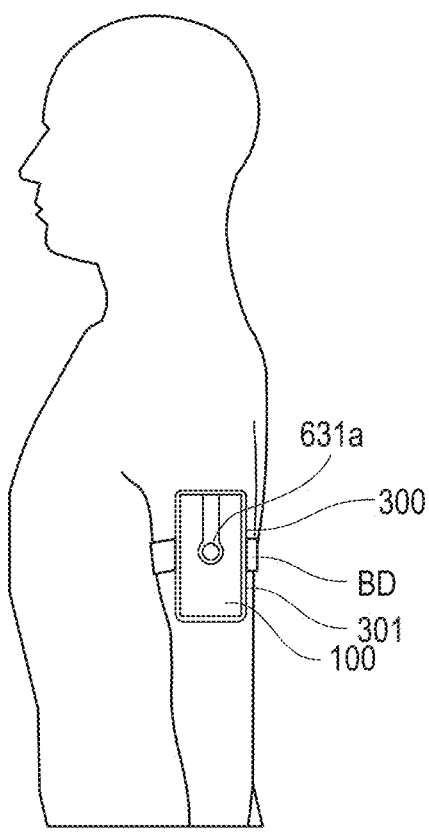
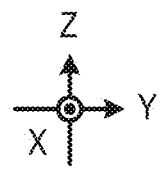
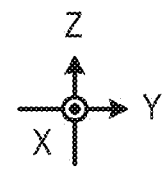

FIG. 3A
FIG. 3B
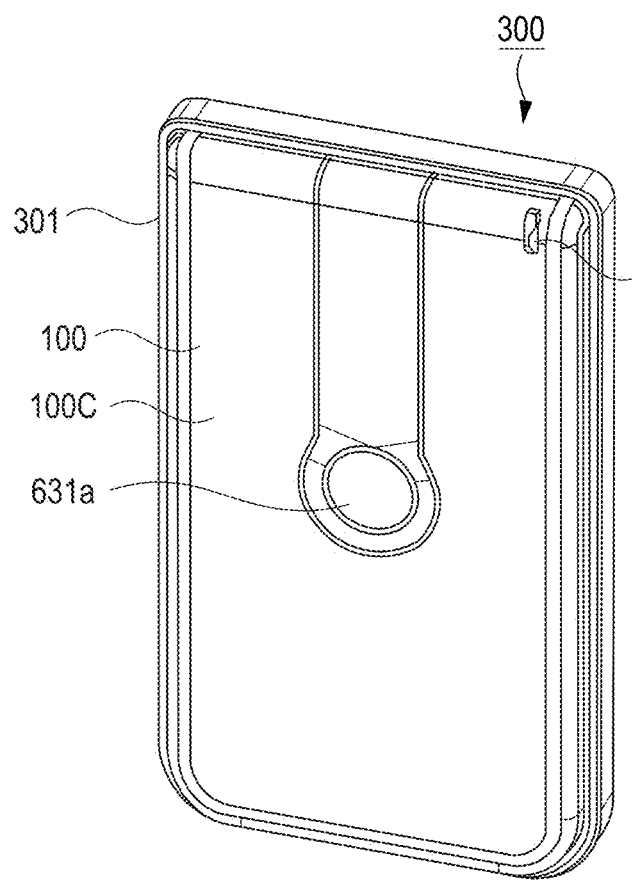
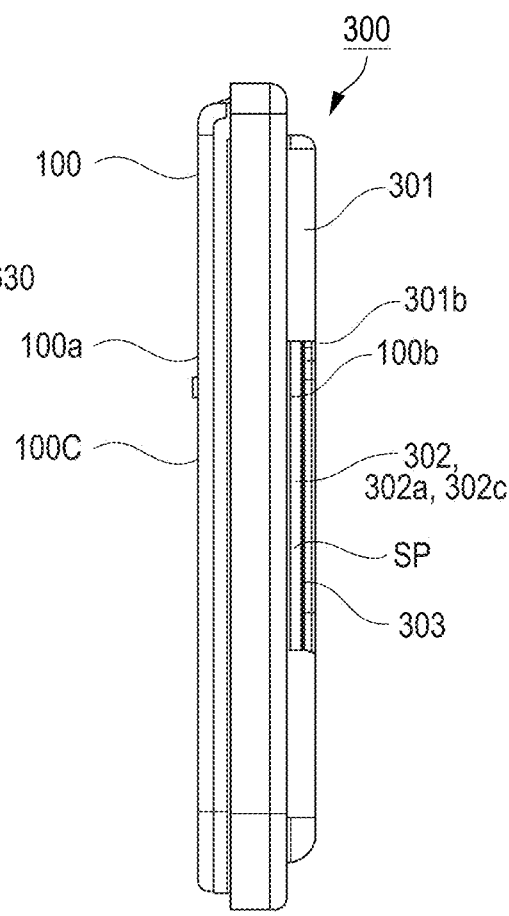

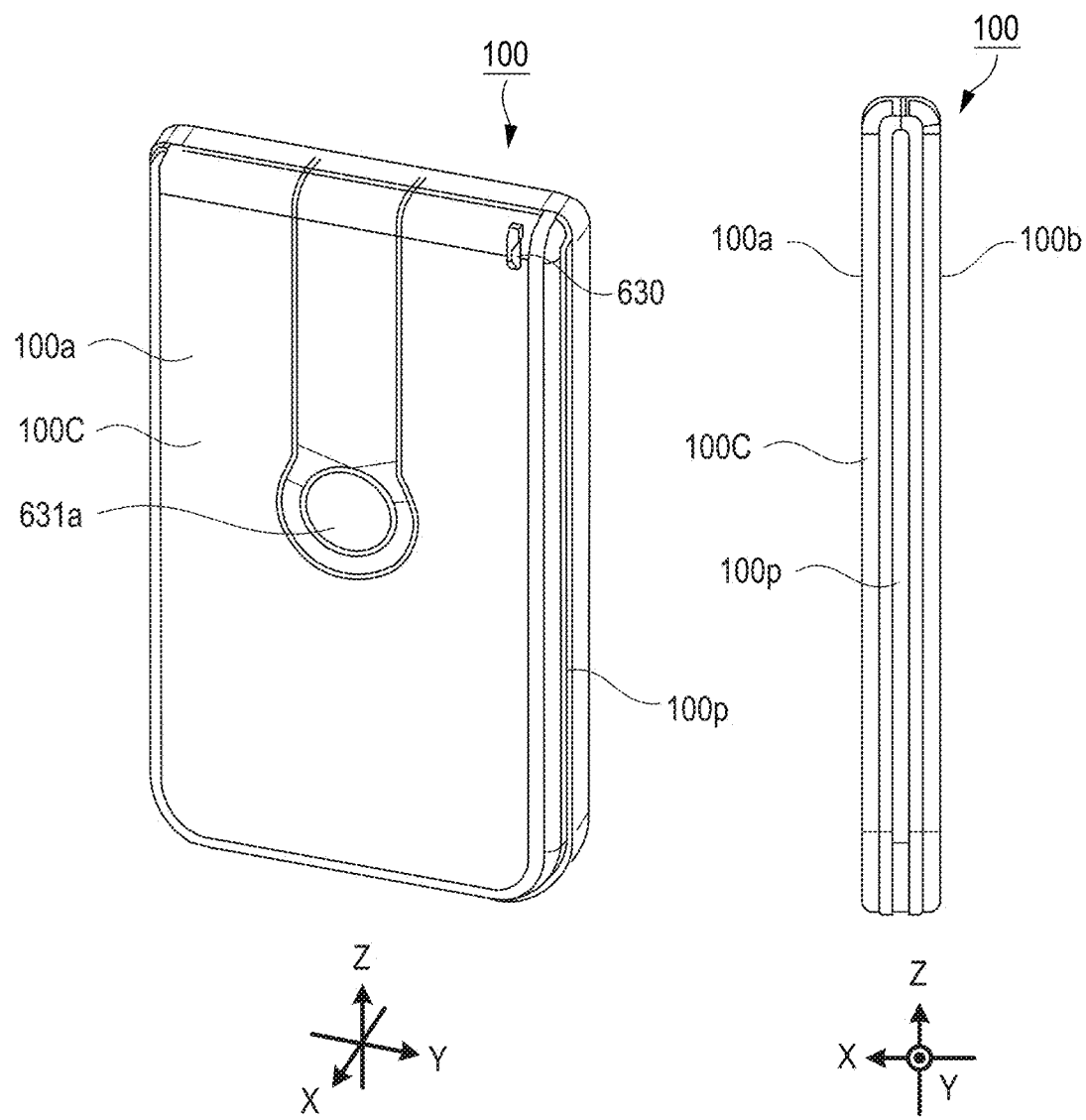

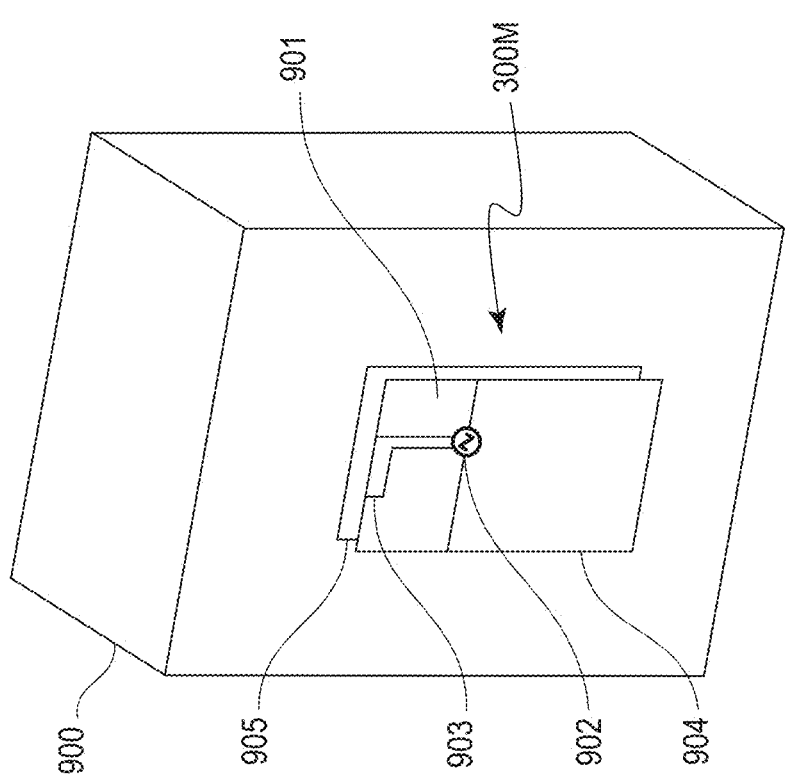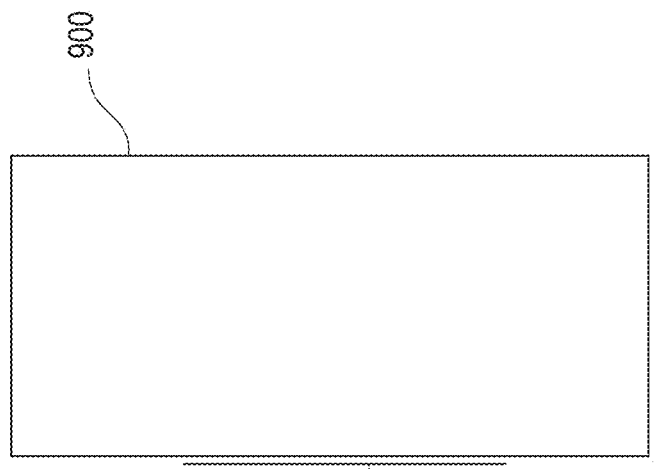

FIG. 12A
FIG. 12B
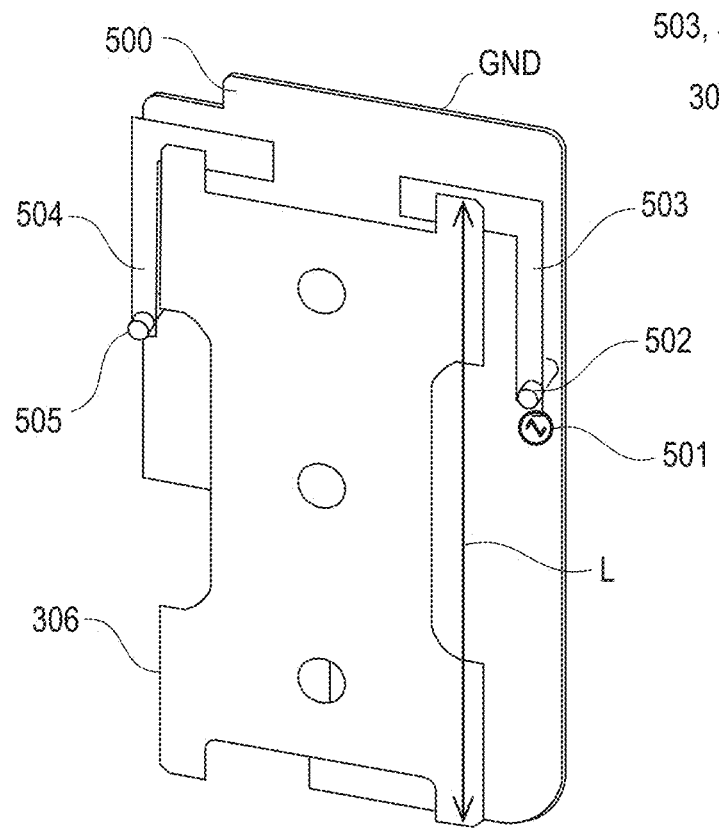
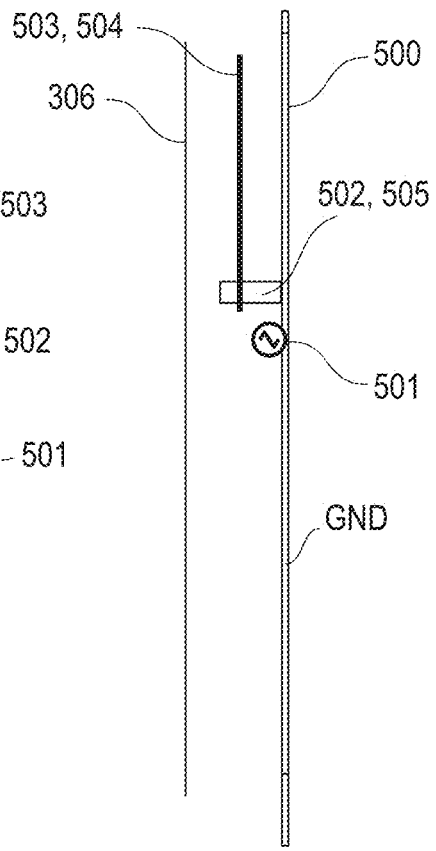

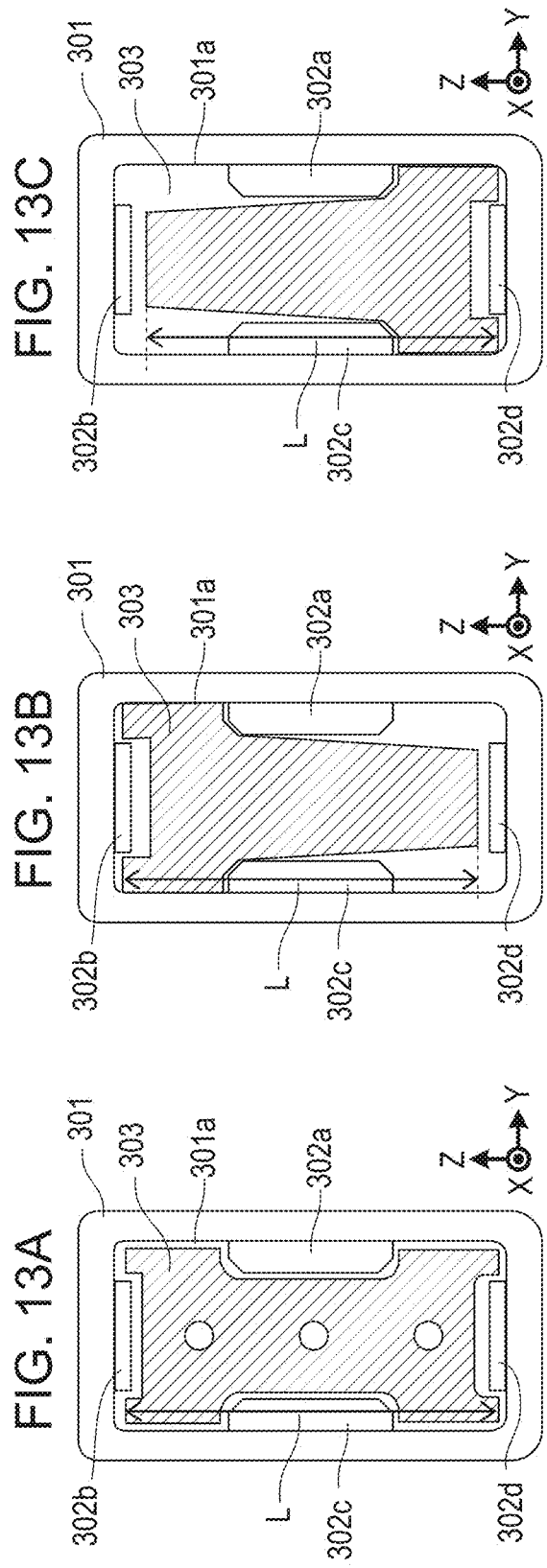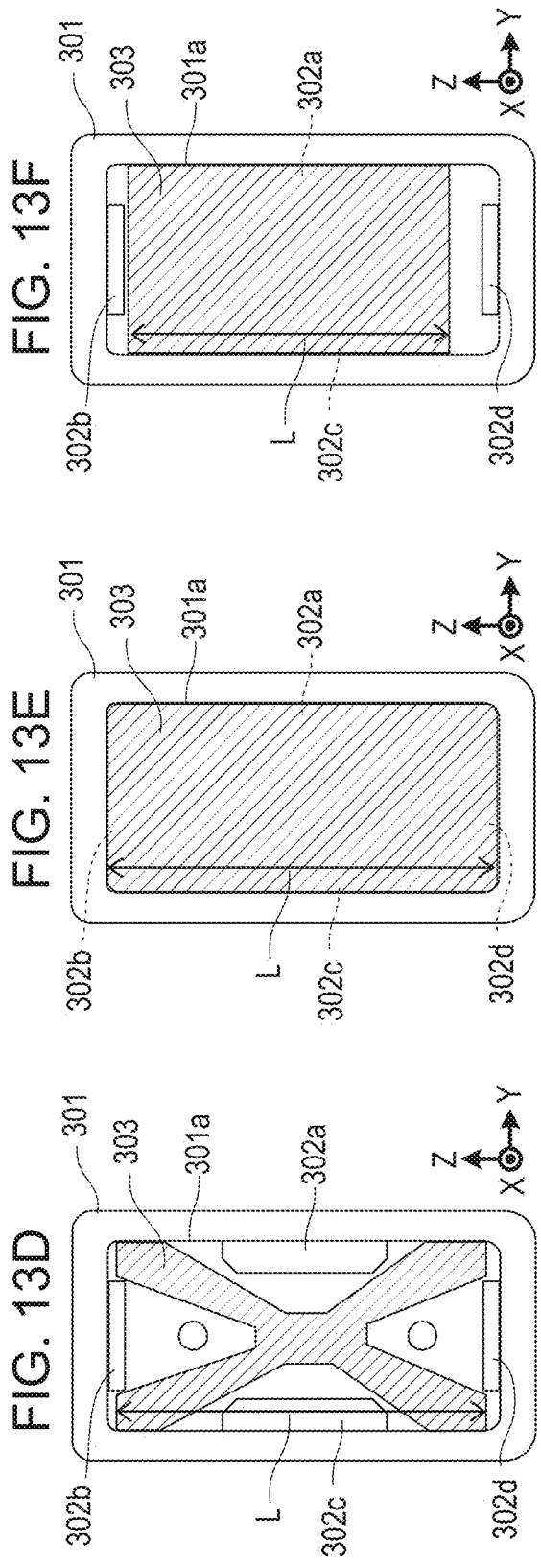

READING APPARATUS AND READING APPARATUS CASE

BACKGROUND OF THE INVENTION

Field of the Invention

The present invention relates to a reading apparatus that performs wireless communication with a wireless device and a reading apparatus case for attaching a reading apparatus body.

Description of the Related Art

A reading apparatus, called an RFID reader or the like, that reads information by wireless communication from a wireless device such as a radio frequency identification (RFID) tag that is attached to a management target such as a human or an object is known. Japanese Patent Laid-Open No. 2015-060442 describes a handheld RFID reader that a user holds by hand and uses and in which a part of a coaxial cable that connects an RFID substrate and an antenna is disposed along a main substrate. According to this document, the gain of the antenna in the longitudinal direction of the main substrate increases because a ground of the main substrate is used as a virtual ground of the antenna.

It is desirable that the size of a reading apparatus to be attached to a human body or an object be small. On the other hand, a reading apparatus having a plate-shaped housing may have a short communication range due to an effect of a human body or the like, because an antenna element is close to the human body or the like in the thickness direction of the housing. Therefore, it is desirable to suppress reduction of the communication range due to the effect of a human body or the like in an in-use state in which the reading apparatus is attached to the human body or the like.

SUMMARY OF THE INVENTION

The present invention provides a reading apparatus and a reading apparatus case that can suppress reduction of a communication range in an in-use state while enabling reduction in size.

An aspect of the present invention provides a reading apparatus including: an antenna element; a substrate including a ground plane that serves as a reference potential of the antenna element and a communication circuit that transmits and receives a radio signal to and from an RFID tag via the antenna element; and a housing that holds the antenna element and the substrate. The housing has a plate-like shape having a length in a first direction that is shorter than a length in a second direction and a length in a third direction, where the first direction is a thickness direction of the substrate, the second direction is a long-side direction of the housing when viewed in the first direction, and the third direction is a short-side direction of the housing when viewed in the first direction. The reading apparatus includes a parasitic element that is disposed apart from the substrate in the first direction and is disposed so as to overlap both of the antenna element and the ground plane when viewed in the first direction, the parasitic element resonating when the antenna element is excited. A length of the parasitic element in the second direction is shorter than ½ of a wavelength of an operation frequency that is used to transmit and receive the radio signal.

Further features of the present invention will become apparent from the following description of exemplary embodiments with reference to the attached drawings.

BRIEF DESCRIPTION OF THE DRAWINGS

FIG. 2A illustrates an example of attachment of the RFID reader according to the first embodiment.

FIG. 2B illustrates an example of attachment of the RFID reader according to the first embodiment.

FIG. 3A is a perspective view of the RFID reader according to the first embodiment.

FIG. 3B is a side view of the RFID reader according to the first embodiment.

FIG. 4A is a perspective view of a reader body according to the first embodiment.

FIG. 4B is a side view of the reader body according to the first embodiment.

FIG. 9A illustrates a simulation model for examining the radiation characteristics of the RFID reader.

FIG. 9B illustrates the simulation model for examining the radiation characteristics of the RFID reader.

FIGS. 12A and 12B are perspective views illustrating the positional relationship among a substrate, an antenna element, and a secondary radiator according to a second embodiment.

FIGS. 13A, 13B, 13C, 13D, 13E, and 13F illustrate the shapes of second radiators according to modifications.

DESCRIPTION OF THE EMBODIMENTS

Hereafter, embodiments according to the present disclosure will be described with reference to the drawings.

First Embodiment

In the following description, the X-axis direction is the thickness direction of an RFID reader 300. The Y-axis direction and the Z-axis direction are directions that are perpendicular to the X-axis direction and perpendicular to each other. In the embodiments described below, the RFID reader 300 has a plate-like (flat-plate-like, tablet-like) outer shape having a dimension (thickness) in the X-axis direction that is smaller than a height and a width viewed in the X-axis direction. The outer shape of the RFID reader 300 is a rectangular shape whose height direction (long-side direction, up-down direction) is the Z-axis direction and whose width direction (short-side direction, left-right direction) is the Y-axis direction when viewed in the X-axis direction. However, the outer shape and the constituent elements of the RFID reader 300 are not limited to those described below, and may be changed appropriately in accordance with the purpose of use. How to choose the Y-axis direction and the Z-axis direction from the in-plane directions perpendicular to the X-axis direction can be changed in accordance with the specific configuration of the RFID reader 300.

The X-axis direction is the thickness direction of a substrate 500 (FIG. 5) accommodated in the housing of the RFID reader 300. That is, suppose that a first direction (the X-axis direction) is the thickness direction of the substrate, a second direction is the long-side direction of the housing when viewed in the first direction, and a third direction is the short-side direction of the housing when viewed in the first direction. In this case, the housing has a plate-like shape having a length in the first direction that is shorter than a length in the second direction and a length in the third direction.

Regarding the X-axis direction, the front side of the RFID reader 300 is the side (+X side) on which a front cover 100a described below is disposed, and the back side of the RFID reader 300 is the opposite side (−X side) on which a back cover 100b described below is disposed. The upper side (+Z side) and the lower side (−Z side) of the RFID reader 300 are the height directions when viewed in the X-axis direction, and the right side (+Y side) and the left side (−Y side) are the width directions when viewed in the X-axis direction.

"RFID reader" includes an RFID reader/writer that has a function of reading information from a wireless device such as an RFID tag and a function of writing information into the wireless device.

1. First Embodiment 1.1. Examples of Use of RFID Reader

Figure 1A:
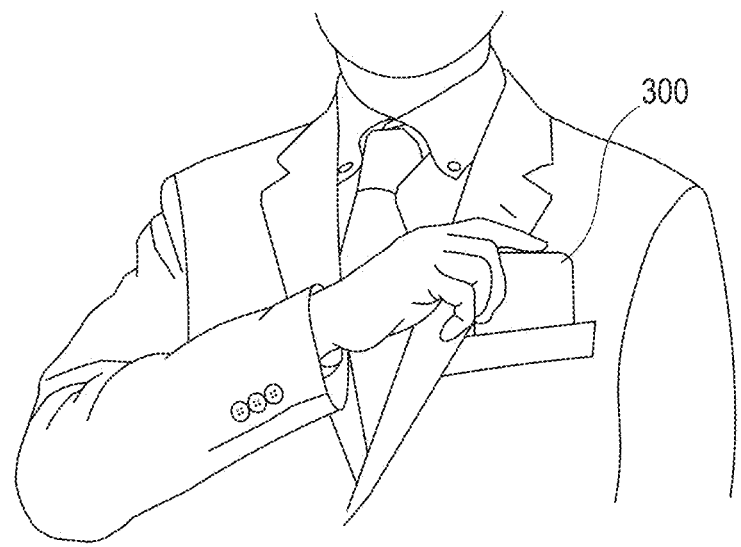
FIG. 1A illustrates an example of use of an RFID reader according to a first embodiment.
Figure 1B:
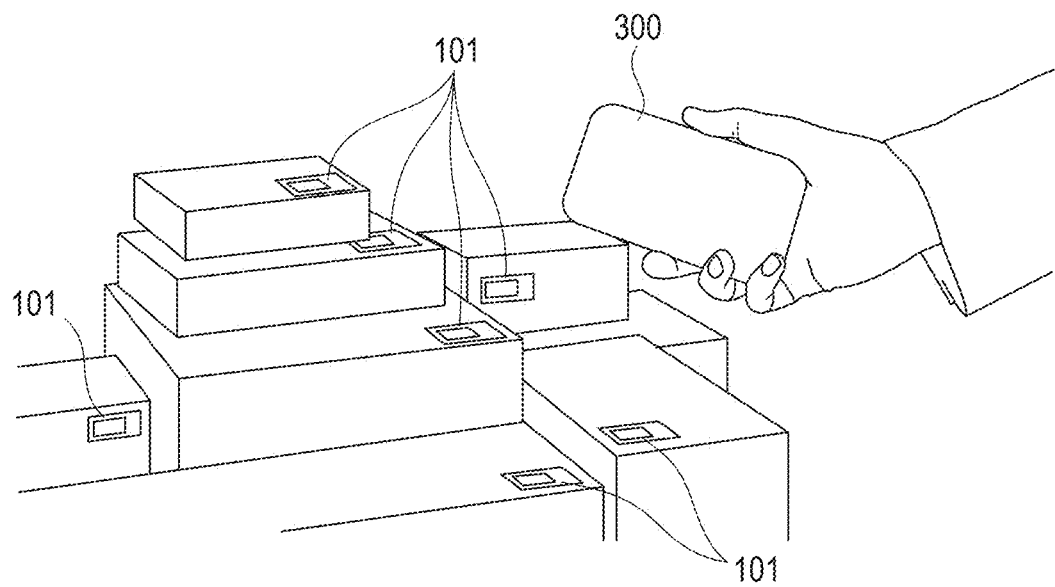
FIG. 1B illustrates an example of use of the RFID reader according to the first embodiment.

In the present embodiment, the RFID reader 300 illustrated in FIGS. 1A and 1B constitutes an RFID system that can determine the positions of targets in a real space based on the result of reading identification information from RFID tags 101 that are disposed to be distributed at a plurality of positions. A target whose position is to be determined may be, for example, an RFID tag 101 itself; or a human, an animal, or an object to which the RFID tag 101 is attached. A target whose position is to be determined may be, for example, the RFID reader 300 that reads identification information, a user holding the RFID reader, or a machine in which the RFID reader is mounted.

FIGS. 1A and 1B each illustrate an example of use of the RFID reader 300. As illustrated in FIG. 1A, in this example, a user carries the RFID reader 300 in a clothes pocket or the like. As illustrated in FIG. 1B, in this example, an RFID tag 101 (referred so as an "article tag") is attached to each of management targets (here, articles). An RFID tag 101 (position tag, reference tag) that serves as the reference of position information is disposed at a specific position in a building.

The RFID reader 300 can grasp the present position of the RFID reader 300 as a relative position with respect to the position tag by calculating a movement amount from the time when the position tag is detected based on a measurement result of a measurement section 608 described below. Moreover, the RFID reader 300 can acquire position information of each of a plurality of articles that are distributed in a real space by associating the present position at a time when an article tag is detected with the ID information of the article tag.

The RFID reader 300 can provide the position information of an article to an external information-processing apparatus via a data communication section 603 described below. A display device such as a liquid crystal panel may be mounted on the RFID reader 300 itself so that the display device can display the position information of an article obtained by the RFID reader 300 or another RFID readier that is communicatively connected to the RFID reader 300.

The examples illustrated in FIGS. 1A and 1B are only examples, and the configuration of an RFID system in which the RFID reader 300 can be used is not limited to these. For example, instead of the configuration such that a user carries the RFID reader 300, the RFID reader 300 may be attached to (mounted on) a movable machine (such as a drone, a vehicle, or a robot). For example, a system may be configured in such a way that the RFID reader 300 is fixed to a predetermined position in a real space and the position of a management target that moves in the real space is grasped by detecting the RFID tag 101 attached to the management target.

The RFID tag 101 is an example of a wireless device whose information can be read by the RFID reader 300. The wireless device may be an active RFID tag. When the wireless device actively (for example, periodically) transmits information to surroundings by using electric power from a battery disposed therein, the device may be called a beacon tag. The wireless device may be a device called an IC tag, an IC card, a responder, or the like. Information that the RFID reader 300 reads from the wireless device is not limited to ID information, and may be information of another type.

1.2. Examples of Attachment of RFID Reader

As illustrated in FIGS. 2A and 2B, the RFID reader 300 according to the present embodiment can be attached to a human body in a way different from being placed in a clothes pocket or the like as illustrated in FIG. 1A. In the example illustrated in FIG. 2A, a user hangs the RFID reader 300 around his/her neck by using a strap ST.

In the example illustrated in FIG. 2B, a user attaches the RFID reader 300 to his/her upper arm by using an arm band BD (a rubber band or a band with a hook-and-loop fastener).

As described below, the RFID reader 300 according to the present embodiment includes a reader body 100 and a case 301. The strap ST is attached to the RFID reader 300 by using, for example, an opening 302e (FIG. 7A) provided in the case 301. The arm band BD is wrapped around an upper arm of a user by using, for example, openings 302a and 302c (FIGS. 7A and 7B) provided in left and right portions of the case 301.

FIGS. 1A, 1B, 2A, and 2B illustrate only examples of use of the RFID reader 300, and the RFID reader 300 may be attached to a human body or another attachment target by using another method. For example, the RFID reader 300 may be attached to an attachment target by joining a hook-and-loop fastener affixed to the back surface of the case 301 to a hook-and-loop fastener affixed to a surface of the attachment target. The RFID reader 300 may be attached to an attachment target by, for example, magnetic attraction of a permanent magnet provided on the case 301 to a permanent magnet (or a magnetic body such as a steel plate) provided on the attachment target.

Irrespective of the attachment method, basically, the RFID reader 300 is attached in such a way that the back side of the RFID reader 300 (−X side) faces a surface (attachment surface) of an attachment target and the front side of the RFID reader 300 (+X side) faces toward a space on a side opposite from the attachment target. In other words, the housing has a first outer surface that is an outer surface of the housing on a first side in the first direction, and the reading apparatus is configured to be attached to an attachment target in a state in which the first outer surface faces the attachment target.

In FIGS. 1A, 1B, 2A, and 2B, the RFID reader 300 may be rotated in a plane perpendicular to the X-axis direction. For example, in the vertically opposite way to FIGS. 2A and 2B, the RFID reader 300 may be attached so that the upper side (+Z side) of the RFID reader 300 faces downward in the vertical direction (gravitational direction). For example, when the RFID reader 300 is to be attached to the ceiling of a building, the elevation angle may be −90 degrees so that the RFID reader 300 faces toward the floor surface.

That is, the RFID reader 300 may be attached so that the front side (+X side) of the RFID reader 300 faces downward in the vertical direction (gravitational direction).

1.3. Housing Configuration of RFID Reader

Referring to FIGS. 3A and 3B, the basic configuration of the RFID reader 300 according to the present embodiment will be described. FIG. 3A is a perspective view of the RFID reader 300, and FIG. 3B is a right-side view of the RFID reader 300.

The RFID reader 300 according to the present embodiment includes the reader body 100 as a reading apparatus body and the case 301 as a case member (reading apparatus case) to which a reading apparatus body is attached. The reader body 100 is attachable to and removable from the case 301.

A secondary radiator 303 (parasitic element) described below is provided in the case 301.

The reader body 100 includes a body case 100C that is a housing of the reader body 100. In the present embodiment, the body case 100C is held by the case 301 (outer case). In an in-use state of the RFID reader 300, the body case 100C and the case 301 are integrated. The body case 100C and the case 301 constitute a housing of the RFID reader 300 according to the present embodiment. The substrate 500 and antenna elements 503 and 504, which are other components of the RFID reader 300, are held in the housing.

In the present embodiment, the reader body 100 is attached to the case 301 by engaging recesses 100p (FIGS. 4A and 4B) provided in the reader body 100 with protrusions 301p (FIG. 7A) provided on the case 301. In other words, the reader body 100 is attached to the case 301 by using a snap-fit mechanism utilizing the elasticity of the case 301. In the example illustrated in the figures, the recesses 100p have groove shapes provided in left and right side portions of the reader body 100, and four protrusions 301p are provided so as to engage with each of left and right groove shapes at upper and lower two positions. The arrangement pattern of the protrusions 301p and the recesses 100p is not limited to that illustrated in FIGS. 4A, 4B, and 7A. Protrusions may be provided on the reader body 100, and recesses that engage with the protrusions may be provided in the case 301.

The protrusions 301p and the recesses 100p are examples of a mechanism (attachment/detachment mechanism) that makes the reader body 100 attachable to and removable from the case 301, and a different attachment/detachment mechanism may be used. The attachment/detachment mechanism may be a mechanical structure other than a snap-fit structure. For example, a slidable lock member may be provided on the case 301, so that the reader body 100 can be attached (fixed) to the case 301 by inserting the lock member into a hole in the reader body 100 and the reader body 100 can be removed from the case 301 by retracting the lock member from the hole. The attachment/detachment mechanism may be a mechanism including a screw, a double-sided tape, or a magnet. As the attachment/detachment mechanism, a mechanism that can prevent unintended removal of the reader body 100 and can hold the reader body 100 when a user carries the RFID reader 300 is used.

One or more openings 302, through which the aforementioned strap ST, the arm band BD, or the like is to be threaded, are provided in the case 301. By using the openings 302, a user can attach the RFID reader 300 to a human body so that the back surface of the RFID reader 300 faces toward the human body (FIGS. 2A and 2B). In other words, the housing has a first outer surface that is an outer surface of the housing on the first side in the first direction, and the housing has an opening for allowing the reading apparatus to be attached to an attachment target in a state in which the first outer surface faces the attachment target.

A space SP that extends through the RFID reader 300 in a direction intersecting the X-axis direction is formed between the case 301 and the back surface of the reader body 100 in the X-axis direction (the thickness direction of the RFID reader 300). An attachment tool such as the strap ST and the arm band BD can be attached to the RFID reader 300 through the openings 302 and the space SP. The arrangement of the openings 302 in the present embodiment will be described below.

It is not necessary to thread anything through the openings 302. For example, when the RFID reader 300 is to be placed in a clothes pocket as illustrated in FIG. 1A, the RFID reader 300 may be used without attaching the strap ST or the like.

The material of the case 301 is, for example, an alloy resin in which polycarbonate (PC) and ABS resin are mixed, but the material is not limited to this. The material of the case 301 may have high rigidity so that the positional relationship between the substrate 500 (described below) in the reader body 100 and the secondary radiator 303 of the case 301 can be maintained.

The case 301 according to the present embodiment has a shape that covers substantially the entire surface of the reader body 100 on the back side (−X side) and a part of a side portion of the reader body 100, but the shape of the case 301 is not limited to this. For example, the case 301 may have a box shape (pouch shape, sleeve shape) that covers substantially the entirety of the reader body 100 including the back side (−X side) and the front side (+X side) of the reader body 100. However, in the present embodiment, an LED 630 and a button 631a are provided on an outer surface of the reader body 100 on the front side (+X side). In this case, it is desirable that the case 301 be configured so that the LED 630 and the button 631a are exposed when viewed from the front side (+X side).

In the present embodiment, an air layer (the space SP) is formed between the reader body 100 and the case 301 in the X-axis direction. Therefore, it is possible to reduce transfer of heat of a heat source (mainly, a power supply 507 described below and the substrate 500) in the reader body 100 to an attachment target of the RFID reader 300 located on the back side (−X side) of the RFID reader 300. Moreover, it is possible to reduce transfer of heat from the attachment target to the substrate 500 in the reader body 100.

The space SP communicates with a space outside of the RFID reader 300 via the openings 302 of the case 301. Therefore, it is possible to release heat to the outside of the RFID reader 300 by movement of air, and it possible to reduce temperature increase of the reader body 100.

1.4. Body Case

The case structure of the reader body 100 according to the present embodiment will be described. FIG. 4A is a perspective view of the reader body 100, and FIG. 4B is a right-side view of the reader body 100.

The reader body 100 according to the present embodiment includes the front cover 100a that forms an outer surface of the reader body 100 on the front side (+X side) and the back cover 100b that forms an outer surface of the reader body 100 on the back side (−X side). Both sides of the substrate 500 described below in the X-axis direction are covered by the front cover 100a and the back cover 100b, and the substrate 500 is accommodated in a space between the front cover 100a and the back cover 100b. That is, the reader body 100 has the body case 100C, which is the housing of the reader body 100, and the body case 100C includes the front cover 100a and the back cover 100b.

In the present embodiment, the front cover 100a and the back cover 100b each have a substantially rectangular shape having a length in the up-down direction (Z-axis direction) that is longer than a length in the left-right direction (Y-axis direction) when viewed in the X-axis direction.

An outer peripheral portion of the front cover 100a is curved toward the back side (−X side) in the thickness direction (X-axis direction), and an outer peripheral portion of the back cover 100b is curved toward the front side (+X side) in the thickness direction (X-axis direction). Therefore, when the outer peripheral portion of the front cover 100a and the outer peripheral portion of the back cover 100b are brought into contact with each other, a space is formed between the front cover 100a and the back cover 100b.

The front cover 100a and the back cover 100b are each made of a resin material that passes an electromagnetic wave in a frequency band that is used for wireless communication with an RFID tag or the like. The front cover 100a and the back cover 100b are fixed to each other by using, for example, a screw. A method of fixing the front cover 100a and the back cover 100b is not limited to using a screw and may be, for example, mechanical joining such as snap fit or fixing using an adhesive.

The length (height, up-down width) of the reader body 100 in the up-down direction (Z-axis direction) and the length (width, left-right width) of the reader body 100 in the left-right direction (Y-axis direction), which are not particularly limited, each may be a size that is suitable to be carried by being attached to a human body in view of usability. For example, the RFID reader 300 including the case 301 may have a size that can be placed in a clothes pocket.

On the outer surface of the body case 100C on the front side (+X side), the button 631a for operating the RFID reader 300, the LED 630 for notifying information to a user, and the recesses 100p for making the reader body 100 attachable to and removable from the case 301 are exposed. The button 631a is an example of an operation unit configured to operate the RFID reader 300. The LED 630 is an example of a display unit configured to display a state of the RFID reader 300.

In other words, the housing has a first outer surface that is an outer surface of the housing on the first side in the first direction (an outer surface of the back cover 100b) and a second outer surface that is an outer surface of the housing on a second side opposite from the first side in the first direction (an outer surface of the front cover 100a). The button 631a as the operation unit is exposed on the second outer surface. Therefore, when the RFID reader 300 is to be attached to a human body, the RFID reader 300 is attached so that a surface on a side opposite from the button 631a faces toward the human body and a surface on which the button 631a is provided faces toward a space opposite from the human body. The LED 630 as the display unit is exposed on the second outer surface. Therefore, when the RFID reader 300 is to be attached to a human body, the RFID reader 300 is attached so that a surface on a side opposite from the LED 630 faces toward the human body and a surface on which the LED 630 is provided faces toward a space opposite from the human body.

The reader body 100 may further include a component that serves to enhance the function of the RFID reader 300 and that is exposed on an outer surface of the body case 100C. For example, a connector for enabling communication with an external apparatus, a connector for receiving supply of electric power from an external power source, an additional strap hole for threading a strap (attachment tool), or an additional LED for notifying information to a user may be provided. A certification seal or the like indicating conformity with technological criteria or standards stipulated by laws and regulations of each country may be affixed to an outer surface of the body case 100C.

1.5. Arrangement of Components in Body Case

Figure 5A:
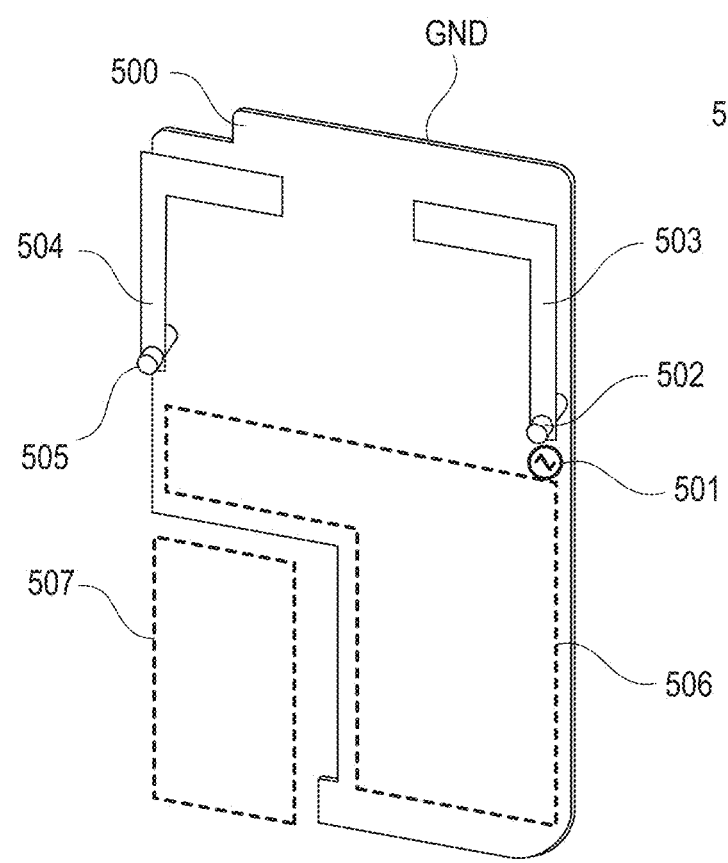
FIG. 5A is a perspective view of components of the RFID reader according to the first embodiment.
Figure 5B:
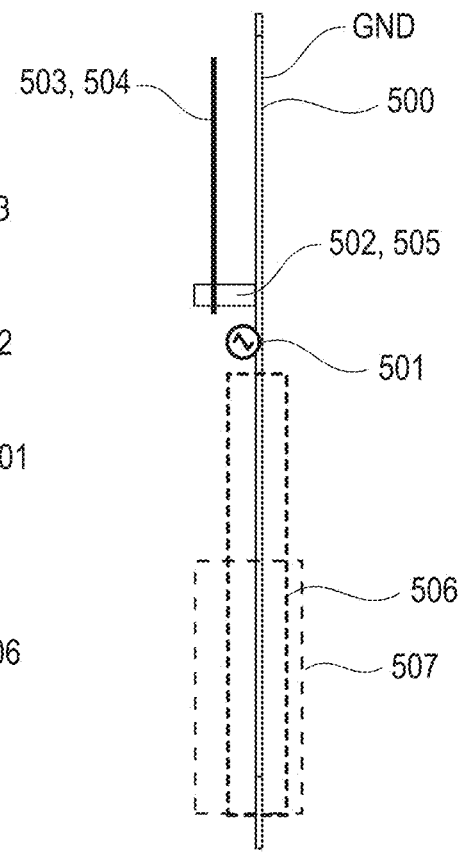
FIG. 5B is a side view of the components of the RFID reader according to the first embodiment.

In the present embodiment, most of the constituent elements of the reader body 100 are arranged on the single substrate 500 in such a way as to be contained in the space between the front cover 100a and the back cover 100b. Referring to FIGS. 5A and 5B, the outer shape of the substrate 500 and the arrangement of components will be described. FIG. 5A is a perspective view of the substrate 500 and the antenna elements 503 and 504, and FIG. 5B is a right-side view of the substrate 500 and the antenna elements 503 and 504.

The reader body 100 includes the substrate 500, a driven antenna element 503, a parasitic antenna element 504, contact pins 502 and 505, and the power supply 507. The substrate 500 includes a circuit section 506, a feeder 501, and a ground plane GND.

As illustrated in FIG. 5A, the substrate 500 has a substantially rectangular outer shape whose long-side direction is the up-down direction (Z-axis direction) and whose short-side direction is the left-right direction (Y-axis direction). The substrate 500 has a plate-like shape intersecting the X-axis direction, and may be perpendicular to the X-axis direction. That is, the thickness direction of the substrate 500 may be parallel to the thickness direction of the RFID reader 300.

The substrate 500 is electrically connected to the driven antenna element 503 and the parasitic antenna element 504 via the contact pins 502 and 505. The driven antenna element 503 and the parasitic antenna element 504 are antenna elements for transmitting and receiving a radio signal. As the driven antenna element 503 and the parasitic antenna element 504, it is possible to use antenna elements including a base member of phosphor bronze whose surface is Ni/Au plated to have an anticorrosive effect and an effect of reducing contact resistance. The driven antenna element 503 and the parasitic antenna element 504 are bonded to, for example, an inner surface of the front cover 100a by using a double-sided tape.

The driven antenna element 503 is connected to the circuit section 506 on the substrate 500 via the contact pin 502 as a connection member and the feeder 501 composed of a conductor pattern formed on the substrate 500. The feeder 501 constitutes a transmission line that transmits a signal between the driven antenna element 503 and the circuit section 506. The feeder 501 includes a passive element (a capacitor, an inductor, a resistor, or the like) for impedance adjustment. The driven antenna element 503 is a driven element that is electrically connected the circuit section 506 on the substrate 500 and that directly receives supply of electric power from the circuit section 506 to radiate an electromagnetic wave.

The parasitic antenna element 504 is connected to the ground plane (GND layer) of the substrate 500 via the contact pin 505. The contact pin 505 and the substrate 500 may be connected to each other via a passive element (a capacitor, an inductor, a resistor, or the like) for impedance adjustment. The parasitic antenna element 504 is not electrically connected to the circuit section 506 on the substrate 500, and does not directly receive supply of electric power from the circuit section 506. The parasitic antenna element 504 is a parasitic element that resonates with an electromagnetic wave radiated by the driven antenna element 503 and thereby radiates an electromagnetic wave together with the driven antenna element 503. Moreover, the driven antenna element 503 and the parasitic antenna element 504 each function as a receiving antenna.

The contact pin 502 and the contact pin 505 each may be a spring-pin contact (spring connector). The contact pin 502 and the contact pin 505 each may have a configuration such that an elastic conductor such as a spring contact directly contacts an antenna element. A part of an antenna element and a part of a contact member on the substrate 500 side may slidably contact each other to establish electrical connection. An antenna element may be fixed by using a metal via or a bent sheet metal.

The total electrical length of the contact pin 502 and the driven antenna element 503 and the total electrical length of the parasitic antenna element 504 and the contact pin 505 each may be shorter than or substantially equal to ¼ of the wavelength of an electromagnetic wave excited from the feeder 501.

As described above, the substrate 500 includes the ground plane GND. The ground plane GND is formed in substantially the entire area of the substrate 500 as a conductive thin-film pattern of copper foil or the like. That is, the size and the shape of the ground plane GND are substantially the same as the outer shape of the substrate 500. The ground plane GND serves as a reference potential of a voltage applied to the driven antenna element 503 by the feeder 501. The substrate 500 used in the present embodiment is a laminated substrate, and includes a multi-layer ground plane GND.

In the present embodiment, the long-side length (length in the Z-axis direction) of the substrate 500 is shorter than ½ of the wavelength (half-wavelength) of the operation frequency of the RFID reader 300. The long-side length (length in the Z-axis direction) of the ground plane GND is shorter than ½ of the wavelength (half-wavelength) of the operation frequency of the RFID reader 300.

The wavelength of the operation frequency of the RFID reader 300 is the wavelength of the center frequency of the frequency band of an electromagnetic wave that the RFID reader 300 uses to transmit and receive a radio signal. For example, when the RFID reader 300 uses an electromagnetic wave in a 920 MHz band (915 MHz to 930 MHz) to transmit and receive a radio signal in Japan, the wavelength of the operation frequency is a wavelength (325 mm) corresponding to 922.5 MHz, which is the center frequency of the frequency band. The operation frequency and the wavelength thereof are appropriately changed in accordance with a frequency band stipulated in laws and regulations for each country or district.

In the ground plane GND, a region that mainly faces the driven antenna element 503 and the parasitic antenna element 504 (a region above the circuit section 506) functions as a part of an antenna. Therefore, it is desirable that electronic components are not disposed in this region. The driven antenna element 503 and the parasitic antenna element 504 each may be constituted by a planar (plate-shaped) element extending in the Y-axis direction and the Z-axis direction. The driven antenna element 503 and the parasitic antenna element 504 according to the present embodiment have shapes each of which is bent in an L-shape so that the open-end side faces upward when viewed from the front side and that are symmetric (left-right symmetric) in the Y-axis direction.

The driven antenna element 503 and the parasitic antenna element 504 illustrated in the figures are examples, and the shapes and the arrangement of the antenna elements can be changed in accordance with directivity, polarization, and the like that are required. For example, the driven antenna element 503 and the parasitic antenna element 504 each may be further divided into a plurality of elements. The RFID reader 300 may have a single antenna element.

An antenna element may be a rectangular plane antenna or a linear antenna such as an inverted F antenna. The driven antenna element 503 and the parasitic antenna element 504 according to the present embodiment have substantially nondirectional and circularly-polarized characteristics if an effect of the secondary radiator 303 or a human body is not considered. However, the antenna elements may have directional or linearly-polarized characteristics. The antenna elements may be configured so that the directivity or the polarization is switchable.

In the present embodiment, the circuit section 506 and the power supply 507 that supplies electric power to the circuit section 506 are disposed together in a region (lower region of the substrate 500) that does not face the driven antenna element 503 and the parasitic antenna element 504. With such a disposition, it is possible to place a conductor pattern that connects electronic components (not shown) on the substrate 500 away from the driven antenna element 503 and the parasitic antenna element 504.

Regarding the driven antenna element 503 and the parasitic antenna element 504, "driven" and "parasitic" may be switched. In this case, the feeder 501 may be disposed on the left side of the substrate 500.

The power supply 507 is disposed on the lower side of the substrate 500 and the left side of the substrate 500. Therefore, an L-shaped cutout is provided in the substrate 500 so as to form a space for accommodating the power supply 507. By accommodating the power supply 507, which has a comparatively large thickness among the constituent elements of the reader body 100, in the cutout provided in the substrate 500, it is possible to reduce the thickness and the size of the entirety of the reader body 100. In this way, with the present embodiment, due to an arrangement such that the substrate 500 has a large ground plane, it is possible to efficiently arrange components in a limited space in the body case 100C while improving antenna performance. Since the dielectric constant and the dielectric loss tangent of a resin material of the front cover 100a and the back cover 100b illustrated in FIGS. 4A and 4B affect electromagnetic wave characteristics, it is desirable to optimize the shapes of the driven antenna element 503 and the parasitic antenna element 504 in accordance with the resin material.

1.6. Basic Configuration of Reader Body

Figure 6:
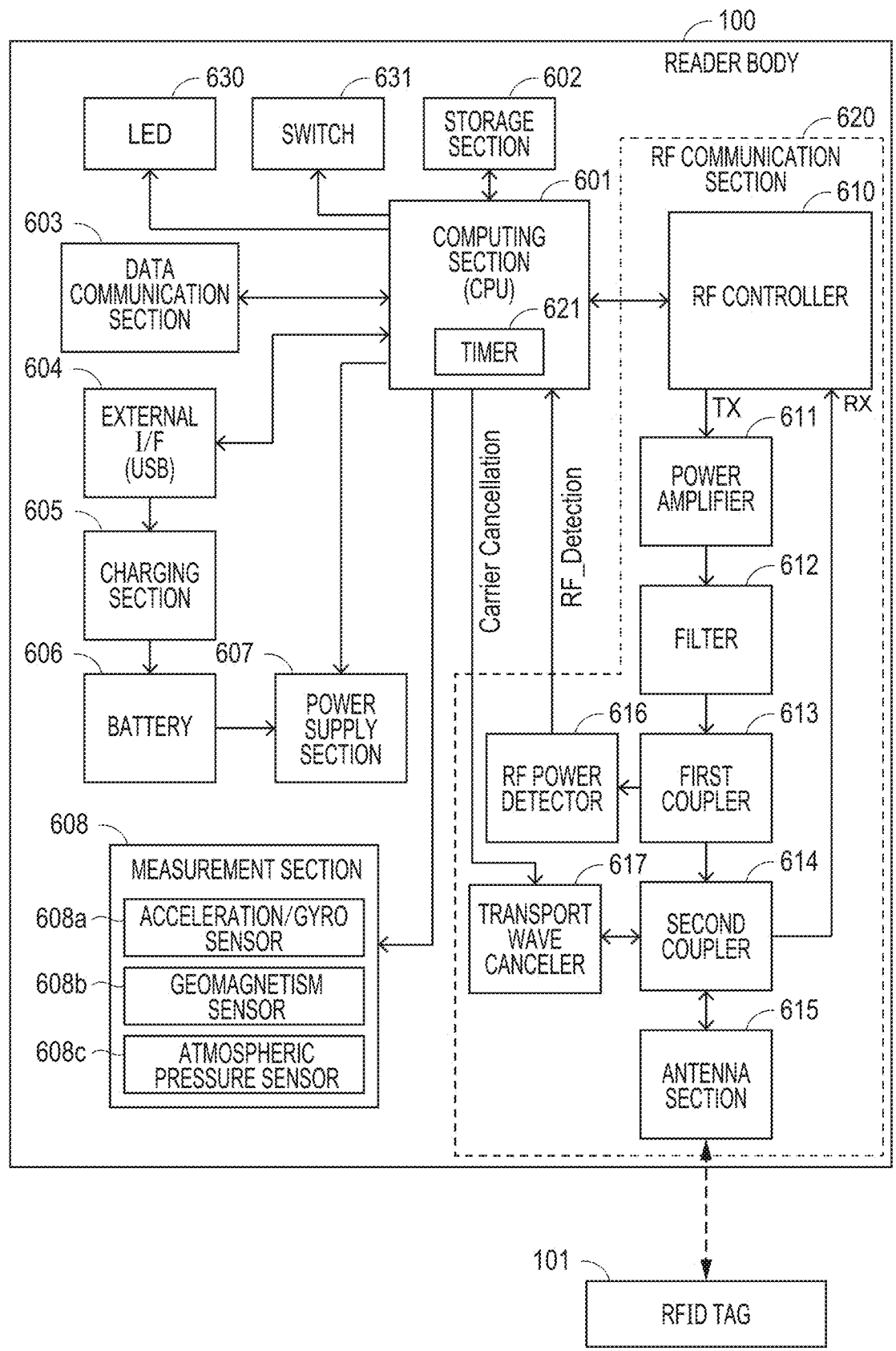
FIG. 6 is a block diagram illustrating the configuration of the RFID reader according to the first embodiment.

Referring to FIG. 6, the constituent elements and the function of the reader body 100 according to the present embodiment will be described. FIG. 6 is a block diagram illustrating an example of the electrical configuration of the reader body 100.

As illustrated in FIG. 6, the reader body 100 includes an antenna section 615 and an RF communication section 620 that performs wireless communication with wireless devices such as the RFID tag 101 via the antenna section 615. The reader body 100 further incudes a computing section 601, a storage section 602, the data communication section 603, an external interface (I/F) 604, a charging section 605, a battery 606, a power supply section 607, the measurement section 608, the LED 630, and a switch 631. Among the constituent elements illustrated in FIG. 6, constituent elements other than the LED 630 and the battery 606 are basically included in the circuit section 506 described above.

The antenna section 615 and the RF communication section 620 constitute a detection unit (reading unit, communication unit) configured to detect the RFID tag 101 and read information from the RFID tag 101. The RFID reader 300 radiates an electromagnetic wave from the antenna section 615. The RF communication section 620 is a communication circuit that is provided on the substrate 500 and that transmits and receives a radio signal via the antenna section 615.

The RFID tag 101 is a passive tag including a small IC chip, a memory, and an antenna; and stores identification information for identifying the tag and like in the memory. The IC chip in the RFID tag 101 operates due to an electromagnetic wave emitted by the RFID reader 300, and transmits ID information over a reflected wave of the electromagnetic wave from the RFID reader 300. The RFID reader 300 reads the ID information from the RFID tag 101 by detecting the electromagnetic wave from the RFID tag 101 via the antenna section 615.

Although the frequency of an electromagnetic wave used for communication between the RFID reader 300 and the RFID tag 101 (called an operation frequency) is not particularly limited, for example, an electromagnetic wave in the UHF band is used. The RFID reader 300 and the RFID tag 101 can perform communication, for example, at a distance of several meters.

The computing section 601 and the storage section 602 function as a controller that controls the operation of the RFID reader 300. The computing section 601 is, for example, a central processing unit (CPU). The storage section 602 includes a read-only memory (ROM) as a non-volatile memory and a random-access memory (RAM) as a volatile memory. The ROM stores, for example, a program defining the operation procedure of the RFID reader 300 and data collected by the RFID reader 300.

The computing section 601 controls the operations of various parts of the RFID reader 300 by executing a program read out from the ROM by using the RAM as a work area. For example, the computing section 601 causes the RF communication section 620 to read RFID tags within a reading range, and causes the storage section 602 to store the read information and the reading time as reading result data. Simultaneously with reading of the RFID tags, the computing section 601 measures the movement amount of the RFID reader 300 based on the result of measurement by the measurement section 608, and causes the storage section 602 to store the measured movement amount and the measuring time as measurement result data. Then, the computing section 601 transmits, together with its own identification information, the reading result data and the measurement result data stored in the storage section 602 to a management server via the data communication section 603. A one-chip microcomputer in which the computing section 601 and the storage section 602 are integrated may be used.

By temporarily storing data in the storage section 602 and transmitting the data at appropriate timing via the data communication section 603, it is possible to reduce the frequency of communication between the RFID reader 300 and an external apparatus and to reduce electric power consumption of the RFID reader 300. Moreover, even when the RFID reader 300 cannot communicate with an external apparatus, it is possible to temporarily store information in the storage section 602.

The computing section 601 includes a timer 621 that sets the operation period of the RFID reader 300. The timer 621 can count a plurality of times parallelly as a timer for measuring time and a timer for determining an elapse of a predetermined period.

The measurement section 608 can measure data about the relative movement amount of the RFID reader 300 and the environment of the RFID reader 300 and output the measured data to the computing section 601. The measurement section 608 according to the present embodiment includes an acceleration/gyro sensor 608a, a geomagnetism sensor 608b, and an atmospheric pressure sensor 608c. The acceleration/gyro sensor 608a measures an acceleration applied to the RFID reader 300 in a device coordinate system specific to the RFID reader 300 and outputs acceleration data. Moreover, the acceleration/gyro sensor 608a measures the angular velocity of the RFID reader 300, that is, a change in the posture of the RFID reader 300 and outputs angular velocity data.

The geomagnetism sensor 608b measures the orientation of the RFID reader 300 in a real space and outputs orientation data. The atmospheric pressure sensor 608c measures the atmospheric pressure of a space in which the RFID reader 300 is placed and outputs atmospheric pressure data.

The measurement section 608 can measure the relative movement amount of the RFID reader 300 by accumulating the acceleration of the RFID reader 300 while converting the direction of the acceleration into a direction in a coordinate system of a real space based on data from the sensors. Measurement of the movement amount may be performed in accordance with any known self-position estimating method. A relative movement amount output from the measurement section 608 to the computing section 601 may be a two-dimensional vector in a plane parallel to the horizontal plane (floor surface) of a target area or may be a three-dimensional vector including a component in the height direction. A reference position for measuring the relative movement amount may be, for example, the position of the RFID reader 300 at a time when the RFID reader 300 is activated.

Although FIG. 6 illustrates an example in which the RFID reader 300 includes the measurement section 608, the measurement section 608 may be included, for example, in an external device that can communicate with the RFID reader 300 and that is held by a user together with the RFID reader 300. In this case, the RFID reader 300 receives, from the external device, movement amount information indicating relative movement amount measured by the measurement section 608.

The types of sensors disposed in the measurement section 608 can be changed in accordance with the purpose of use of the RFID reader 300. If, for example, the RFID reader 300 is to be used in a state of being fixed at a predetermined position in a real space, the RFID reader 300 need not have the measurement section 608.

The RF communication section 620 is an electronic circuit that is controlled by the computing section 601 and transmits and receives an electromagnetic wave to and from the RFID tag 101 via the antenna section 615. The RF communication section 620 includes an RF controller 610, a power amplifier 611, a filter 612, a first coupler 613, a second coupler 614, an RF power detector 616, and a transport wave canceler 617.

The RF controller 610 follows an instruction from the computing section 601 and outputs a transmission signal (for example, a signal modulated in a UHF band) from a transmission terminal to the power amplifier 611. The power amplifier 611 amplifies the transmission signal input from the RF controller 610 and outputs the transmission signal to the filter 612.

The filter 612 removes unnecessary frequency components from the transmission signal amplified by the power amplifier 611. The power of RF output can be changed in accordance with an instruction of the computing section 601.

The first coupler 613 distributes the transmission signal that has passed the filter 612 to the second coupler 614 and the RF power detector 616. The second coupler 614 outputs the transmission signal input from the first coupler 613 to the antenna section 615, and outputs a received signal input from the antenna section 615 to the RF controller 610. By using, for example, a circulator instead of the second coupler 614, a path for sending a transmission signal from the first coupler 613 to the antenna section 615 may be separated from a path for sending a received signal received by the antenna section 615 to the RF controller 610.

The antenna section 615 includes at least one antenna element. The antenna section 615 radiates the transmission signal input from the second coupler 614 as an electromagnetic wave around the RFID reader 300. The antenna section 615 receives a signal returned from the RFID tag 101 and outputs the received signal to the second coupler 614.

The RF power detector 616 detects the power level of the signal input from the first coupler 613, and outputs a signal (RF_Detection) indicating the detected power level to the computing section 601.

The transport wave canceler 617 cancels a transport wave component of the received signal received by the antenna section 615 by using the second coupler 614 based on a signal (Carrier Cancellation) indicating the power level of a transport wave accepted from the computing section 601. Thus, the transport wave canceler 617 extracts a desired signal component of the received signal to be output to an RX terminal of the RF controller 610. The RF controller 610 acquires ID information and other information returned from the RFID tag 101 by demodulating the signal input from the RX terminal, and outputs the acquired information to the computing section 601.

The data communication section 603 is a connection unit (external communication section) configured to communicatively connect the RFID reader 300 to an external apparatus (target other than the RFID tag 101). The data communication section 603 is, for example, a wireless module section for performing Bluetooth (registered trademark) communication, and may be a wireless module for performing Wi-Fi communication. The data communication section 603 may be a wireless local area network (WLAN) interface for communicating with a WLAN access point, or may be a cellular communication interface for communicating with a cellular base station. The data communication section 603 may be a connection interface for connection with a transponder (for example, a terminal held by a user).

The external I/F 604 is a communication interface for connecting the RFID reader 300 and an external apparatus by wire. The firmware of the RFID reader 300 can be updated by communication via the external I/F. The external I/F 604 according to the present embodiment also serves as an interface that is connected to a power cable for receiving supply of electric power for charging the battery 606. The external I/F 604 is, for example, a universal serial bus (USB) connector (USB port).

The charging section 605 is a circuit for charging the battery 606. The charging section 605 includes a charging IC (charging control IC) that controls a voltage and a current supplied to the battery 606 while monitoring the state of the battery 606. The charging section 605 charges the battery 606 by using electric power supplied from the outside via the external I/F 604.

The battery 606 is a secondary battery that is rechargeable and reusable, such as a lithium-ion battery. The power supply section 607 is a circuit that includes a DC-DC converter and the like and that supplies a power voltage to various parts of the RFID reader 300 by receiving supply of electric power from the battery 606.

The light emitting diode (LED) 630 is a display unit or a display section configured to notify the state of the RFID reader 300 to the outside. Turning on and off of the LED 630 is controlled by the computing section 601. As the display unit, a multicolor LED chip that includes a plurality of LEDs and can emit light in a plurality of colors may be used. For example, the LED 630 emits green light during use, emits amber light during charging, and is turned off when the power is off.

The switch 631 is an operation unit or an operation section configured to switch the operation states of the RFID reader 300 from the outside. The switch 631 is a tactile switch that operates when the button 631a (FIG. 4A) is pressed by a user. For example, a user can turn on/off the RFID reader 300 by pressing and holding the button 631a, and can perform firmware reset by further holding the button 631a. Additionally, a user may be allowed to instruct the RFID reader 300 to start and stop reading the RFID tag 101 or to undergo transition to a power-saving mode by pressing the button 631a.

The computing section 601 interprets the content of an operation by a user based on the present operation state of the RFID reader 300 and how the switch 631 is operated (including the length of pressing time and the number of pressing operations). However, the operation state of the RFID reader 300 is not limited to this. Instead of the switch 631 or in addition to the switch 631, an operation unit that receives an operation by a user on the RFID reader 300 may be included.

The driven antenna element 503, the parasitic antenna element 504, the contact pin 502, and the contact pin 505 illustrated in FIGS. 5A and 5B correspond to the antenna section 615 illustrated in FIG. 6. The feeder 501 and the circuit section 506 illustrated in FIG. 5 include at least the RF controller 610, the power amplifier 611, the filter 612, the first coupler 613, the second coupler 614, the RF power detector 616, and the transport wave canceler 617 illustrated in FIG. 6. The power supply 507 illustrated FIGS. 5A and 5B includes at least the battery 606 illustrated in FIG. 6.

1.7. Case

Figure 7A:
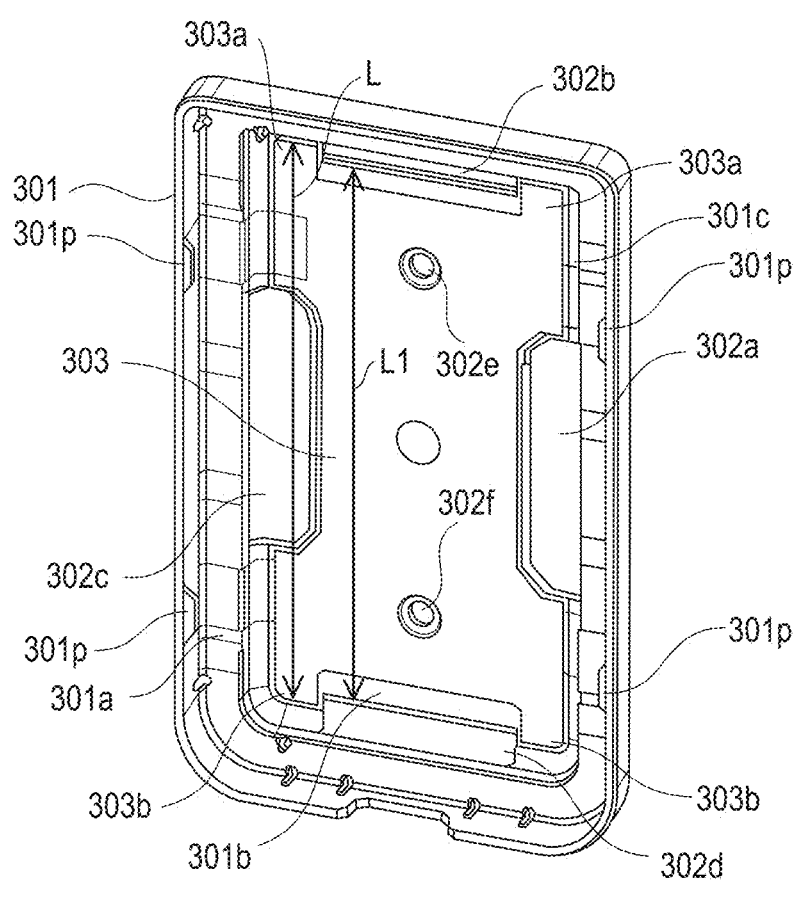
FIG. 7A is a perspective view of a case according to the first embodiment.
Figure 7B:
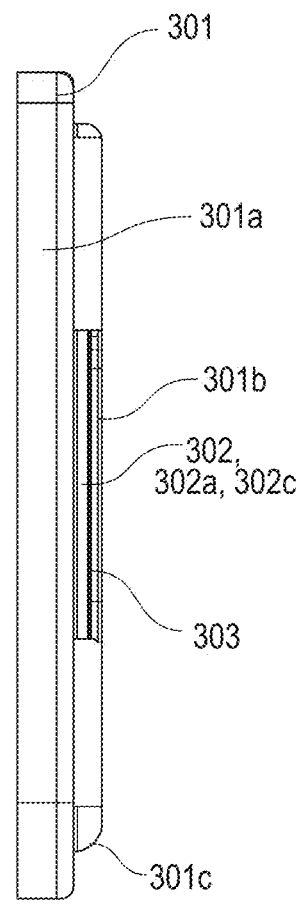
FIG. 7B is a side view of the case according to the first embodiment.

Referring to FIGS. 7A and 7B, the case 301 according to the present embodiment will be described. FIG. 7A is a perspective view of the case 301, and FIG. 7B is a right-side view of the case 301.

As illustrated in FIGS. 7A and 7B, the case 301 is a substantially rectangular member whose long-side direction is the up-down direction (Z-axis direction) when viewed in the X-axis direction. The case 301 includes an outer peripheral portion 301a, a planar portion 301b, the secondary radiator 303, and one or more openings 302.

In the present embodiment, the one or more openings 302 include the opening 302a provided in a right portion of the case 301, an opening 302b provided in an upper portion of the case 301, and the opening 302c provided in a left portion of the case 301. Moreover, in the present embodiment, the one or more openings 302 include an opening 302d provided in a lower portion of the case 301 and two openings 302e and 302f respectively provided in an upper portion and a lower portion of the planar portion 301b of the case 301.

The planar portion 301b and the outer peripheral portion 301a cover the body case 100C from the back side (–X side). The planar portion 301b and the outer peripheral portion 301a are formed so as to substantially wrap the back cover 100b of the body case 100C.

The planar portion 301b has a substantially rectangular shape smaller than the back cover 100b of the body case 100C when viewed in the X-axis direction, and has a planar shape extending in the Y-axis direction and the Z-axis direction. The outer peripheral portion 301a is formed so as to surround the upper, lower, left, and right peripheries of the planar portion 301b when viewed in the X-axis direction. A peripheral edge of the outer peripheral portion 301a extends in the X-axis direction so as to face the upper, lower, left, and right side surfaces of the body case 100C. On the peripheral edge of the outer peripheral portion 301a, one or more protrusions 301p that engage with the recesses 100p of the body case 100C (FIGS. 4A and 4B) are provided.

The planar portion 301b protrudes toward the back side (–X side) with respect to the outer peripheral portion 301a. Therefore, the space SP (FIG. 3B), which is a gap in the X-axis direction, is formed between the planar portion 301b of the case 301 and the back cover 100b of the reader body 100. The outer peripheral portion 301a and the planar portion 301b are connected by a curved-surface region 301c that is smoothly curved.

The opening 302a on the right side has a shape such that a portion of the curved-surface region 301c located on the right side with respect to the planar portion 301b and a right end portion of the planar portion 301b are cut out toward the central side in the Y-axis direction. The opening 302c on the left side has a shape such that a portion of the curved-surface region 301c located on the left side with respect to the planar portion 301b and a left end portion of the planar portion 301b are cut out toward the central side in the Y-axis direction. The opening 302b on the upper side has a shape such that a portion of the curved-surface region 301c located on the upper side with respect to the planar portion 301b and an upper end portion of the planar portion 301b are cut out toward the central side in the Z-axis direction. The opening 302d on the lower side has a shape such that a portion of the curved-surface region 301c located on the lower side with respect to the planar portion 301b and a lower end portion of the planar portion 301b are cut out toward the central side in the Z-axis direction.

When the RFID reader 300 according to the present embodiment is viewed in the Y-axis direction (FIG. 7B), the opening 302a on the right side, the space SP between the case 301 and the reader body 100, and the opening 302c on the left side overlap. That is, a space that extends in the Y-axis direction from the opening 302a on the right side to the opening 302c on the left side through the space SP is formed in the RFID reader 300. When the RFID reader 300 according to the present embodiment is viewed in the Z-axis direction, the opening 302b on the upper side, the space SP between the case 301 and the reader body 100, and the opening 302d on the lower side overlap. That is, a space that extends in the Z-axis direction from the opening 302b on the upper side to the opening 302d on the lower side through the space SP is formed in the RFID reader 300.

Through the space extending as described above, it is possible to easily attach the strap ST and the arm band BD (FIGS. 2A and 2B), and it is possible to more easily attach the RFID reader 300 to a human body.

The left and right openings 302a and 302c each have a shape elongated in the Z-axis direction. The long-side lengths of the left and right openings 302a and 302c are each about ½ to ⅓ of the long-side length (Z-axis direction length) of the case 301. The left and right openings 302a and 302c are each provided at substantially the center of the case 301 in the Z-axis direction.

The upper and lower openings 302b and 302d each have a shape elongated in the Y-axis direction. The long-side lengths the upper and lower openings 302b and 302d are each about ½ to ⅓ of the short-side length (Y-axis direction length) of the case 301. The upper and lower openings 302b and 302d are each provided at substantially the center of the case 301 in the Y-axis direction.

The openings 302e and 302f, which are provided in the planar portion 301b, are each provided at substantially the center of the case 301 in the Y-axis direction, and are respectively disposed on the upper side and on the lower side with the center of the case 301 in the Z-axis direction therebetween. When the RFID reader 300 is to be hung around a neck as illustrated in FIG. 2A, the strap ST can be threaded through the opening 302e. When the arm band BD is to be wrapped around an upper arm as illustrated in FIG. 2B, the arm band BD can be threaded through the left and right openings 302a and 302c.

The arrangement of the openings 302a to 302f described above is an example, and the number, the arrangement, and the shapes of the openings can be changed. The methods of attaching the RFID reader 300 to a human body illustrated in FIGS. 2A and 2B are examples, and the openings 302a to 302f may be used by using another method. If the RFID reader 300 is supposed to be used without attaching the strap ST or the like, the openings 302 need not be provided in the case 301.

1.8. Secondary Radiator

Figure 8A:
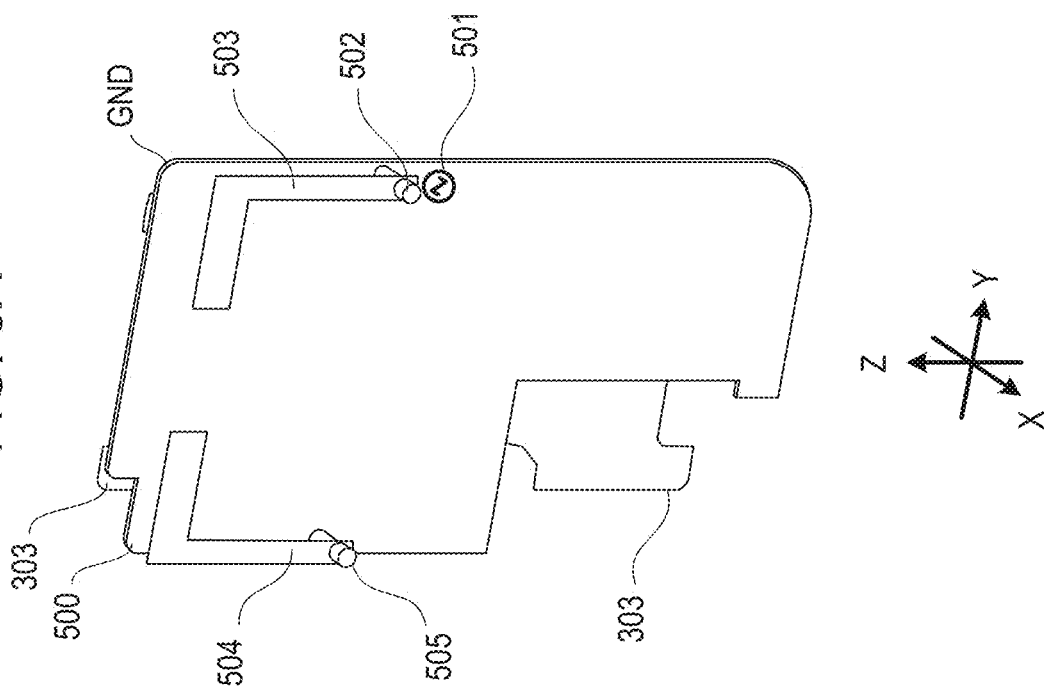
FIG. 8A is a perspective view illustrating the positional relationship among a substrate, an antenna element, and a secondary radiator according to the first embodiment.

As illustrated in FIG. 8A, the RFID reader 300 includes the secondary radiator 303 as a parasitic element that resonates when the antenna elements 503 and 504 are excited. The secondary radiator 303 functions as a new radiation source by resonating with an electromagnetic wave radiated from the antenna elements as a primary radiator, and thereby increases the directivity of the radiation pattern of the RFID reader 300 in the thickness direction (the X-axis direction). In the present embodiment, by providing the secondary radiator 303, the main lobe direction of the radiation pattern of the RFID reader 300 becomes a direction toward the back side (−X side) in the X-axis direction, in a state (an unused state) in which the RFID reader 300 is not attached to a human body or the like.

Figure 8B:
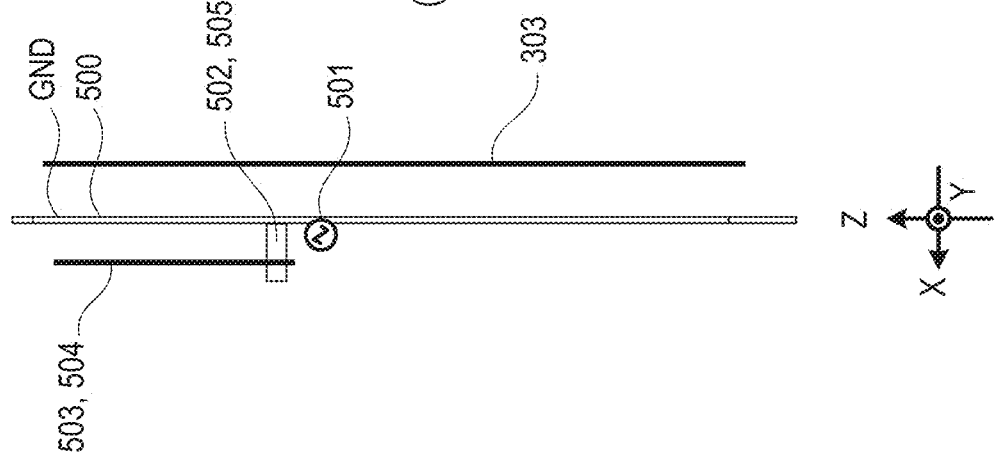
FIG. 8B is a side view illustrating the positional relationship among the substrate, the antenna element, and the secondary radiator according to the first embodiment.
Figure 8C:
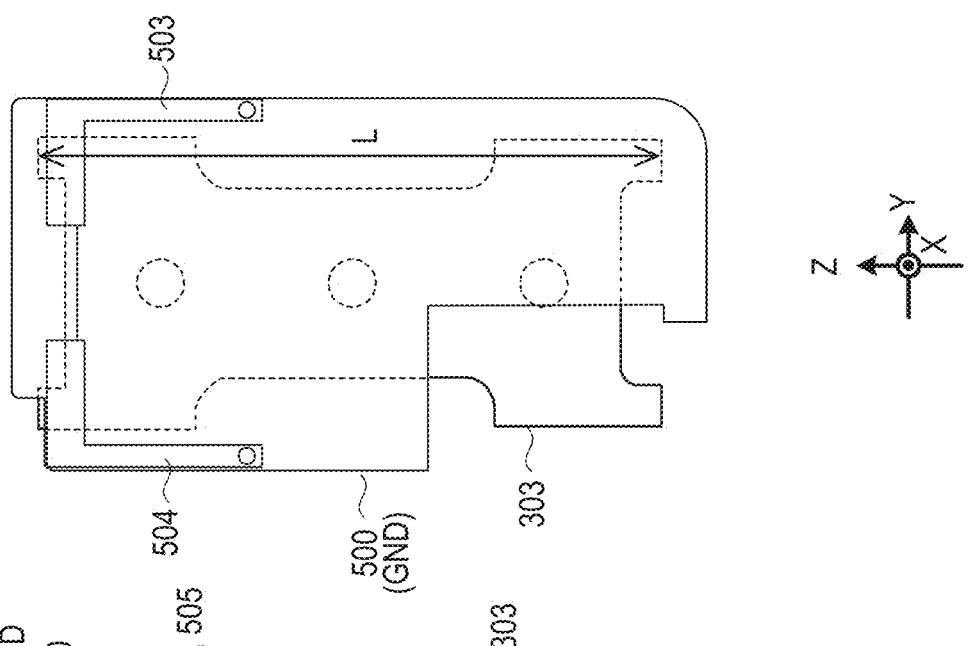
FIG. 8C is a front view illustrating the positional relationship among the substrate, the antenna element, and the secondary radiator according to the first embodiment.

The secondary radiator 303 is disposed apart from the substrate 500 in the X-axis direction (FIG. 8B), and is disposed so as to overlap both of the antenna elements 503 and 504 and the ground plane GND when viewed in the X-axis direction (FIG. 8C). In other words, a parasitic element according to the present embodiment is disposed apart from the substrate in the first direction, and is disposed so as to overlap both of the antenna element and the ground plane when viewed in the first direction.

The length of the secondary radiator 303 in the Z-axis direction is shorter than or equal to ½ of the wavelength of the operation frequency of the RFID reader 300. Thus, as described below, it is possible to suppress reduction of the communication range in an in-use state while enabling reduction in size of the RFID reader 300.

The secondary radiator 303 according to the present embodiment is provided on a surface of the case 301 on the front side (+X side). At least a part of the secondary radiator 303 has a plate-like shape intersecting the X-axis direction, and may have a substantially planar shape (substantially flat-plate-like shape) perpendicular to the X-axis direction. The entirety of the secondary radiator 303 may have a planar shape (flat-plate-like shape) perpendicular to the X-axis direction. A plate-like shape refers to a shape having a length and a width each of which is sufficiently greater than a thickness, including an extremely thin sheet-like shape such as a metal foil.

In the present embodiment, the secondary radiator 303 has a substantially rectangular shape whose long-side direction is the Z-axis direction (see also FIG. 8A) when viewed in the X-axis direction. To be more specific, the secondary radiator 303 has a shape substantially corresponding to the planar portion 301b, and the secondary radiator 303 is not provided in a region where the planar portion 301b does not exist due to the openings 302a to 302f. Although a hole is provided between the opening 302e and the opening 302f (the center of the planar portion 301b) in the secondary radiator 303 illustrated in the figures, the hole need not be provided.

The secondary radiator 303 is disposed in an area from the planar portion 301b to the curved-surface region 301c of the case 301 so as to avoid the openings 302a to 302f. In particular, end portions 303a and 303b of the secondary radiator 303 in the Z-axis direction extend to positions that overlap the opening ranges of the openings 302b and 302d in the Z-axis direction at positions that are different, in the Y-axis direction, from the opening 302b (first opening) and the opening 302d (second opening) that are respectively provided in an upper portion and a lower portion of the case 301. The length L of the secondary radiator 303 in the Z-axis direction is longer than the distance L1 between the openings 302b and 302d in the Z-axis direction. In other words, an end portion of the parasitic element in the second direction extends to a position that overlaps the opening range of the first opening in the second direction at a position that is different from the first opening in the third direction. The length of the parasitic element in the second direction is longer than the distance between the first opening and the second opening in the second direction.

By allowing the secondary radiator 303 to have a sufficient length in the Z-axis direction while avoiding the openings 302b and 302d in this way, it is possible to further increase the gain toward the back side (−X side) in a state in which the RFID reader 300 is not attached to a human body or the like. As a result, it is possible to further increase the gain toward the front side (+X side) in an in-use state in which the RFID reader 300 is attached to a human body or the like.

The size of the secondary radiator 303 when viewed in the X-axis direction is substantially equivalent to the size of the substrate 500 (see also FIG. 8A). To be more specific, the length of the secondary radiator 303 in the Y-axis direction is shorter than or equal to the length of the substrate 500, which is accommodated in the body case 100C, in the Y-axis direction. Moreover, the length of the secondary radiator 303 in the Z-axis direction is shorter than or equal to the length of the substrate 500, which is accommodated in the body case 100C, in the Z-axis direction. By using the secondary radiator 303 having such a size, without unnecessarily increasing the size of the case 301, it is possible to increase the gain toward the front side (+X side) of the RFID reader 300 due to a function of the secondary radiator 303 as described below.

The secondary radiator 303 is made from, for example, a copper tape, but the material is not particularly limited and may be another metal (good conductor). The secondary radiator 303 may be, for example, integrally formed with a resin portion of the case 301 as a molded interconnect device (MID). The secondary radiator 303 may be formed by bonding a metal foil to the case 301 via a double-sided tape. The secondary radiator 303 may be provided on the back side (−X side) of the case 301. When the openings 302a to 302f are not used, the secondary radiator 303 may be provided so as to close the openings that are not used.

1.9. Positional Relationship Among Secondary Radiator, Substrate, and the Like The positional relationship among the secondary radiator 303 and components of the RFID reader 300 in the housing according to the present embodiment will be described. Here, the components of the RFID reader 300 in the housing are the following: the feeder 501, the contact pin 502, the driven antenna element 503, the parasitic antenna element 504, the contact pin 505, and the ground plane GND. FIG. 8A is a perspective view of the components of the RFID reader 300 in the housing and the secondary radiator 303. FIG. 8B is a right side view of the components of the RFID reader 300 in the housing and the secondary radiator 303. FIG. 8C is a front view of the components of the RFID reader 300 in the housing and the secondary radiator 303.

The secondary radiator 303 is disposed on one of the front side (+X side) and the back side (−X side) of the substrate 500 in the X-axis direction (FIG. 8A). In the first embodiment, the secondary radiator 303 is disposed on the back side (−X side) of the substrate 500.

The secondary radiator 303 is disposed on a side opposite from the driven antenna element 503 and the parasitic antenna element 504 with respect to the ground plane GND in the X-axis direction. In other words, the secondary radiator 303 is disposed on one side (the back side, −X side) with respect to the ground plane GND in the X-axis direction. The driven antenna element 503 and the parasitic antenna element 504 are disposed on the other side (the front side, +X side) with respect to the ground plane GND in the X-axis direction.

When the driven antenna element 503 is excited by the circuit section 506 of the substrate 500, the parasitic antenna element 504 resonates, and the driven antenna element 503 and the parasitic antenna element 504 radiate an electromagnetic wave. That is, the driven antenna element 503 and the parasitic antenna element 504 function as a primary radiator that radiates an electromagnetic wave in the housing of the RFID reader 300. The ground plane GND has a function as an antenna element that radiates an electromagnetic wave together with the driven antenna element 503 and the parasitic antenna element 504 due to a mirror-image effect.

Although the secondary radiator 303 is not electrically connected to the circuit section 506 of the substrate 500, the secondary radiator 303 functions as a new radiation source (parasitic element) by resonating with the primary radiator. The secondary radiator 303 according to the present embodiment increases the gain toward the back side (−X side) of the RFID reader 300, compared with a comparative example in which the secondary radiator 303 is not provided, in an unused state in which the RFID reader 300 is not attached to a human body.

As described above, the RFID reader 300 is used in a state of being attached to a human body so that the back side (−X side) is close to the human body in the thickness direction (the X-axis direction) (FIGS. 2A and 2B).

A part of an electromagnetic wave radiated from the RFID reader 300 toward the back side (−X side) is reflected by the human body. As a result, in an in-use state, the gain on the front side (+X side) of the RFID reader 300, which is a side opposite from the human body with respect to the RFID reader 300, increases. Moreover, in an in-use state, it is possible to make the direction of the main lobe of the RFID reader 300 face toward the front side (+X side) in the X-axis direction.

As described above, in the present embodiment, the length L of the secondary radiator 303 in the Z-axis direction (second direction), which is the long-side direction of the RFID reader 300, is shorter than ½ of the wavelength of the operation frequency of the RFID reader 300. By purposely intensifying radiation of an electromagnetic wave toward the back side (−X side) due to the secondary radiator 303 while using the secondary radiator 303 having such a small size, it is possible to increase the gain on the front side (+X side) in an in-use state of being attached to a human body or the like.

It might be possible to increase the gain on the front side (+X side) in an in-use state by, instead of using the secondary radiator 303, causing a copper tape having a length L that is longer than or equal to ½ of the wavelength of the operation frequency to function as a reflector. With this configuration, however, the size of the RFID reader 300 in the Z-axis direction increases.

With the present embodiment, it is possible to provide a reading apparatus and a reading apparatus case that can suppress reduction of a communication range when attached to a human body or the like while enabling reduction in size.

Reflection of an electromagnetic wave on the back side of the RFID reader 300 (−X side) can occur due to an attachment target other than a human body. Also in a case where the RFID reader 300 is attached to an attachment target including a dielectric having a high dielectric constant or a conductor made of a metal, advantages similar to those of a case where the RFID reader 300 is attached to a human body are obtained.

A portion to which the RFID reader 300 is attached may be, for example, a portion that is comparatively flat and has a surface larger than the wavelength of the operation frequency, such as the chest of a human body (FIG. 2A), so that the gain on the front side (+X side) can be further increased.

Other configurations of the secondary radiator 303 and the RFID reader 300 will be described.

The secondary radiator 303 and the ground plane GND of the substrate 500 may have substantially the same shape when viewed in the X-axis direction. For example, the secondary radiator 303 and the ground plane GND each may have a shape having a length in the Z-axis direction (the long-side direction of the RFID reader 300) that is longer than a length in the Y-axis direction (the short-side direction of the RFID reader 300) when viewed in the X-axis direction.

Thus, it is possible to cause the secondary radiator 303 to resonate more efficiently. It is possible to dispose the secondary radiator 303 and the ground plane GND by more effectively using the space in the housing of the RFID reader 300.

The long-side length (length in the Z-axis direction) of the ground plane GND and the long-side length L of the secondary radiator 303 each may be shorter than ½ of the wavelength of the operation frequency of the RFID reader 300. Thus, it is possible to dispose the ground plane GND and the secondary radiator 303 by more effectively using the space in the housing of the RFID reader 300.

At least a part of the ground plane GND and at least a part of the secondary radiator 303 may be parallel to each other. Thus, it is possible to cause the secondary radiator 303 to resonate more efficiently.

The resonant mode of the secondary radiator 303 differs from the resonant mode of the ground plane GND of the substrate 500. The secondary radiator 303 functions as a patch antenna. In other words, the secondary radiator 303 exhibits an electric field distribution such that the electric field intensity is the maximum at both end portions in the long-side direction (Z-axis direction) and the electric field intensity is the minimum at a middle portion in the long-side direction (Z-axis direction). On the other hand, the ground plane GND serves as an equipotential surface for forming a mirror image of the driven antenna element 503 and the parasitic antenna element 504.

1.10. Evaluation of Antenna Characteristics by Using Model

In order to examine that it is possible to increase the gain on the front side (+X side) in an in-use state by using the secondary radiator, the radiation characteristics of the RFID reader are simulated by using a simulation model illustrated in FIGS. 9A and 9B. FIG. 9A is a perspective view of a simulation model simulating a human body and the RFID reader 300 in a state of being attached to the human body. FIG. 9B is a right-side view of the simulation model.

The simulation model includes an RFID reader 300M as a simplified model of the RFID reader 300 and a dielectric 900 (human body phantom) simulating a human body. The RFID reader 300M includes a substrate 901, a feeder 902, a driven antenna element 903, a ground plane 904, and a secondary radiator 905. The substrate 901, the feeder 902, the driven antenna element 903, the ground plane 904, and the secondary radiator 905 respectively correspond to the substrate 500, the feeder 501, the driven antenna element 503, the ground plane GND, and the secondary radiator 303; and the dimensions and the materials of these members are equivalent. Although the RFID reader 300M will be described as a model for simulation in the present description, an apparatus having the same element arrangement as that of the RFID reader 300M may be used as an actual RFID reader. Findings obtained from the present model basically apply to the RFID reader 300 according to the first embodiment.

The sizes of the dielectric 900 in the X-axis direction, the Y-axis direction, and the Z-axis direction are respectively 120 mm, 180 mm, and 240 mm. The material of the dielectric 900 is a human body phantom (relative dielectric constant 55, dielectric constant 1.06 siemens/m) simulating a composition stipulated in certification by each country. The sizes of the substrate 901 in the X-axis direction, the Y-axis direction, and the Z-axis direction are respectively 1 mm, 67 mm, and 120 mm, and the material of the substrate 901 is FR-4 (relative dielectric constant 4.4). The driven antenna element 903 is an L-type antenna having an element length of 55 mm, a line width of 4 mm, and a conductor thickness of 0.035 mm. The sizes of the ground plane 904 in the X-axis direction, the Y-axis direction, and the Z-axis direction are respectively 0.35 mm, 67 mm, and 82 mm. In the RFID reader 300M, the driven antenna element 903 is disposed on the upper side (+Z side) of the substrate 901, the ground plane 904 is disposed on the lower side (−Z side) of the substrate 901, and the distance therebetween in the Z-axis direction is 0.5 mm.

The sizes of the secondary radiator 905 in the X-axis direction, the Y-axis direction, and the Z-axis direction are respectively 0.1 mm, 67 mm, and 120 mm. When viewed in the X-axis direction, the substrate 901, including the driven antenna element 903 and the ground plane 904, and the secondary radiator 905 are disposed so as to overlap each other. The distance (first separation distance) between the substrate 901 and the secondary radiator 905 in the X-axis direction is 15 mm. This distance corresponds to the width (the X-axis direction width) of the space SP that is formed between the reader body 100 and the case 301 when the case 301 is attached to the reader body 100 in the first embodiment.

The first separation distance may be, for example, longer than or equal to 1/60 of the wavelength of the operation frequency of the RFID reader 300 and shorter than or equal to 1/4 of the wavelength. Thus, compared with a case where the first separation distance is set outside of the above range, it is possible to increase the gain of the RFID reader 300 in the X-axis direction (in the present embodiment, the gain on the back side (−X side)).

The substrate 901 and the secondary radiator 905 are disposed to be located at the center of the dielectric 900 when viewed in the X-axis direction. The distance (second separation distance) between the secondary radiator 905 and the dielectric 900 in the X-axis direction is 2.5 mm. This distance simulates the distance from the secondary radiator 303 to a human body surface (mainly the thickness of the case 301 and the thickness of clothes) when a user places the RFID reader 300 according to the first embodiment in a clothes pocket.

The second separation distance may be small. For example, the secondary radiator 303 may be provided on an outer surface of the case 301, and the RFID reader 300 may be used in a state in which the secondary radiator 303 is in contact with a human body surface (the second separation distance is zero).

It is assumed that the driven antenna element 903, the ground plane 904, and the secondary radiator 905 are each a PEC (perfect electric conductor), and the driven antenna element 903 is excited at a frequency of 920 MHz.

The radiation characteristics of the RFID reader 300M in the simulation model are evaluated.

Figure 10A:
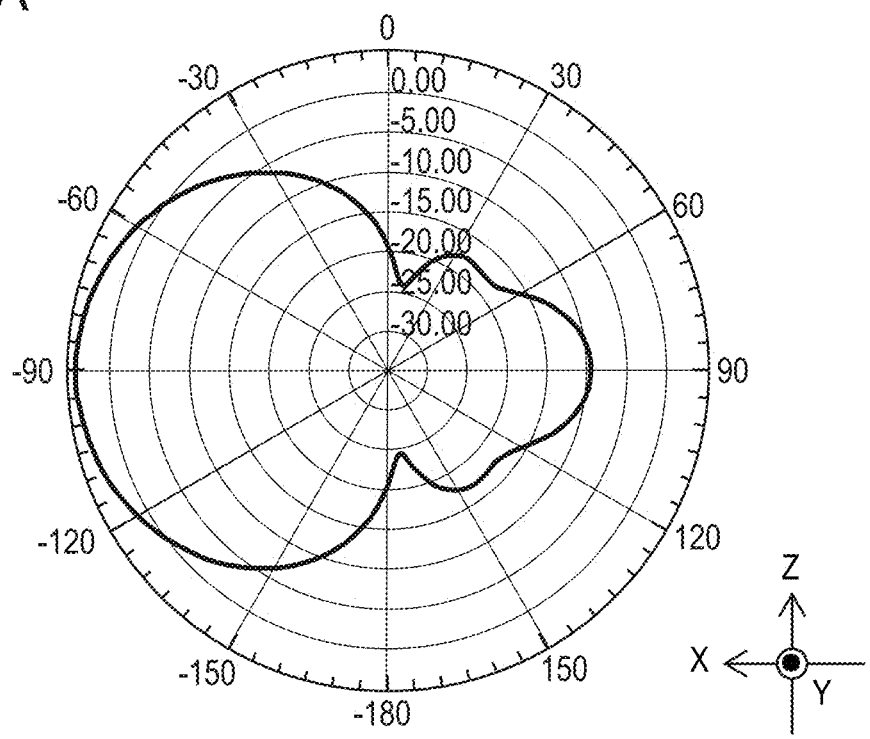
FIGS. 10A, 10B, 10C, and 10D illustrate radiation patterns in the simulation model.

FIG. 10A illustrates obtained radiation patterns in decibels. The coordinate system of FIG. 10A is the same as that of FIG. 9B. In a plane (ZX plane) perpendicular to the Y-axis direction, the RFID reader 300M has a high gain on the +X side (the front side of the RFID reader), and a gain difference of 20 dB from those in the upward direction (+Z side) and the downward direction (−Z side) is obtained. Therefore, when the RFID reader 300M is at the center of the coordinate axes and the RFID tag 101 is placed in the forward direction of the RFID reader 300M, stable communication can be realized even at a large distance. Accordingly, even when a user moves around while holding the RFID reader 300M or when the RFID tag 101 is attached to a target that moves, the RFID reader 300M can more reliably detect the RFID tag 101 on the front side.

Figure 10B:
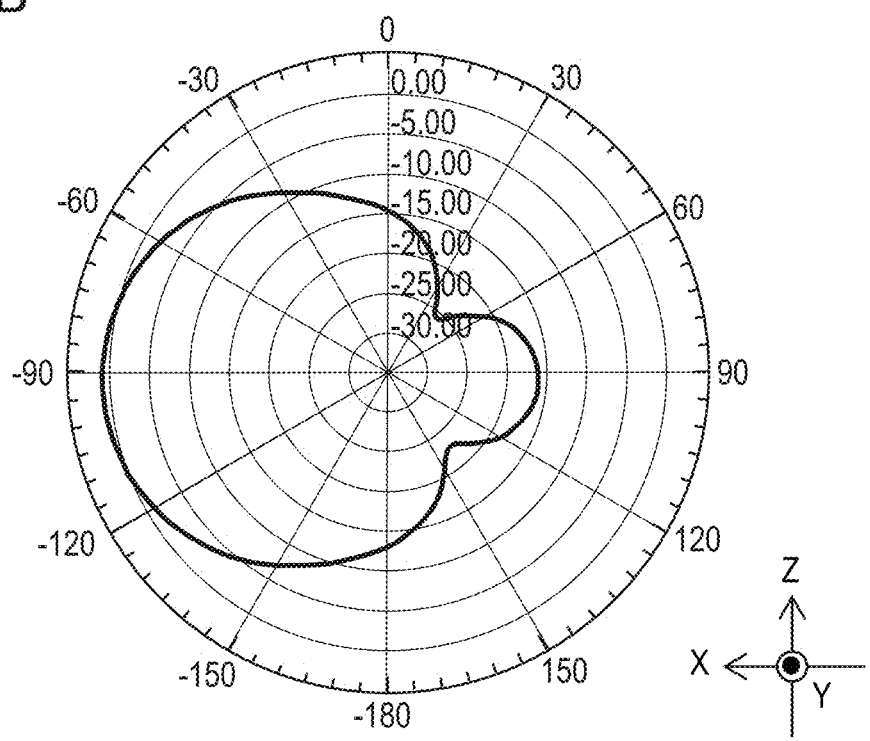
Figure 10C:
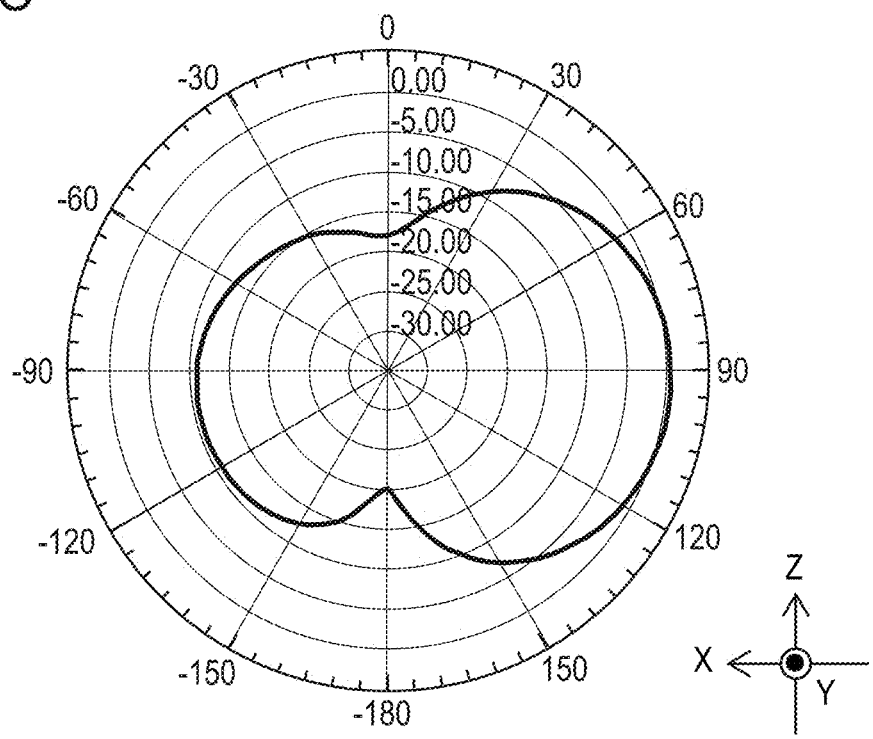
Figure 10D:
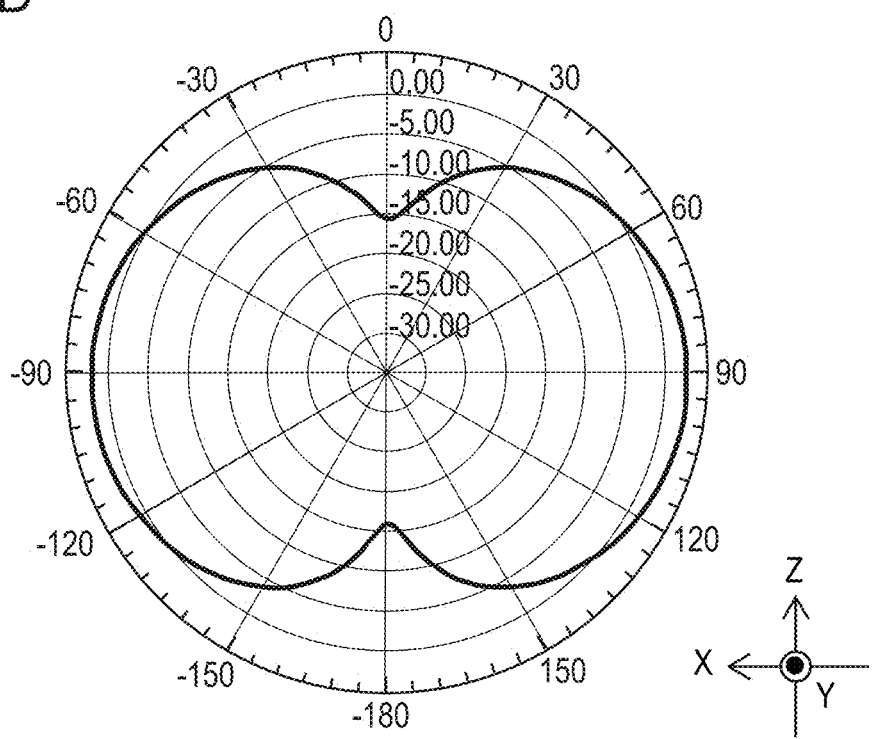

FIG. 10A illustrates the radiation characteristics in a state of FIGS. 9A and 9B, that is, a state in which the RFID reader 300M including the secondary radiator 905 is attached to the dielectric 900 (human body phantom) (attached state/with a secondary radiator). For comparison, FIG. 10B illustrates the radiation characteristics of a simulation model in which the secondary radiator 905 is removed from the model illustrated in FIGS. 9A and 9B (attached state/without a secondary radiator). FIG. 10C illustrates the radiation characteristics of a simulation model in which the dielectric 900 is removed from the model illustrated in FIGS. 9A and 9B (unattached state/with a secondary radiator). FIG. 10D illustrates the radiation characteristics of a simulation model in which the dielectric 900 and the secondary radiator 905 are removed from the model illustrated in FIGS. 9A and 9B (unattached state/without a secondary radiator).

As illustrated in FIG. 10D, when there is no effect of the secondary radiator 905 and the dielectric 900, the RFID reader 300M does not have directivity in the X-Y plane, and the gain difference between the front side (+X side) and the back side (−X side) is approximately zero. When an effect of the dielectric 900 is added to the state of FIG. 10D, the gain toward the front side (+X side) slightly decreases as illustrated in FIG. 10B.

In contrast, as illustrated in FIG. 10C, in a case of the RFID reader 300M including the secondary radiator 905, the main lobe direction is toward the back side (−X side) in a state in which the RFID reader 300M is not attached to the dielectric 900. That is, when there is no effect of the dielectric 900, the gain on the back side (−X side) is greater than the gain on the front side (+X side). In other words, by providing the secondary radiator 905, radiation of an electromagnetic wave toward the back side (−X side) increases compared with a case where the secondary radiator 905 is not provided (FIG. 10D). When the RFID reader 300M including the secondary radiator 905 is attached to the dielectric 900, the gain on the front side (+X side) becomes greater than the gain on the back side (−X side) as illustrated in FIG. 10A.

Here, when the model of FIG. 10A (attached state/with a secondary radiator) and the model of FIG. 10B (attached state/without a secondary radiator) are compared, the gain on the front side (+X side) of the model of FIG. 10A is greater by about 3 dB. This means that, when the RFID reader (FIG. 10C) whose radiation of an electromagnetic wave toward the back side (−X side) is increased by the secondary radiator 905 is attached to a human body, an electromagnetic wave is reflected by the human body, and, as a result, the gain on the front side (+X side) becomes greater. That is, it can be understood that, compared with an RFID reader that does not have the secondary radiator 905, the RFID reader 300M having the secondary radiator 905 has a large gain on the front side (+X side) in an in-use state of being attached to a human body. The gain difference of 3 dB means that the communication range of the RFID reader 300M doubles.

1.11. Evaluation of Antenna Characteristics in First Embodiment

Figure 11A:
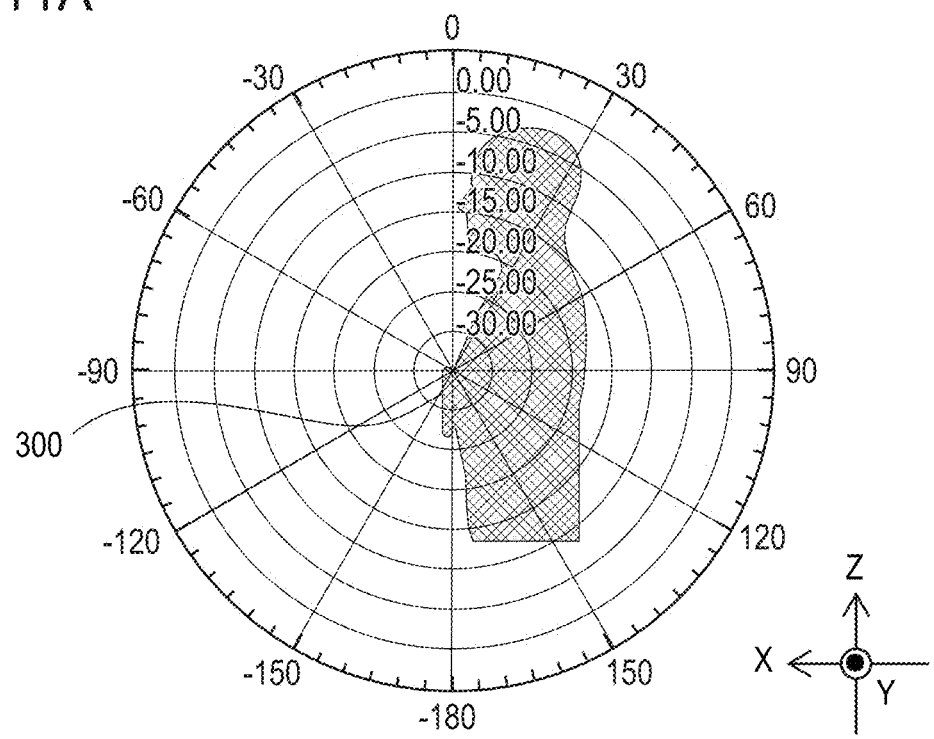
FIGS. 11A, 11B, and 11C illustrate radiation patterns of the RFID reader according to the first embodiment.
Figure 11B:
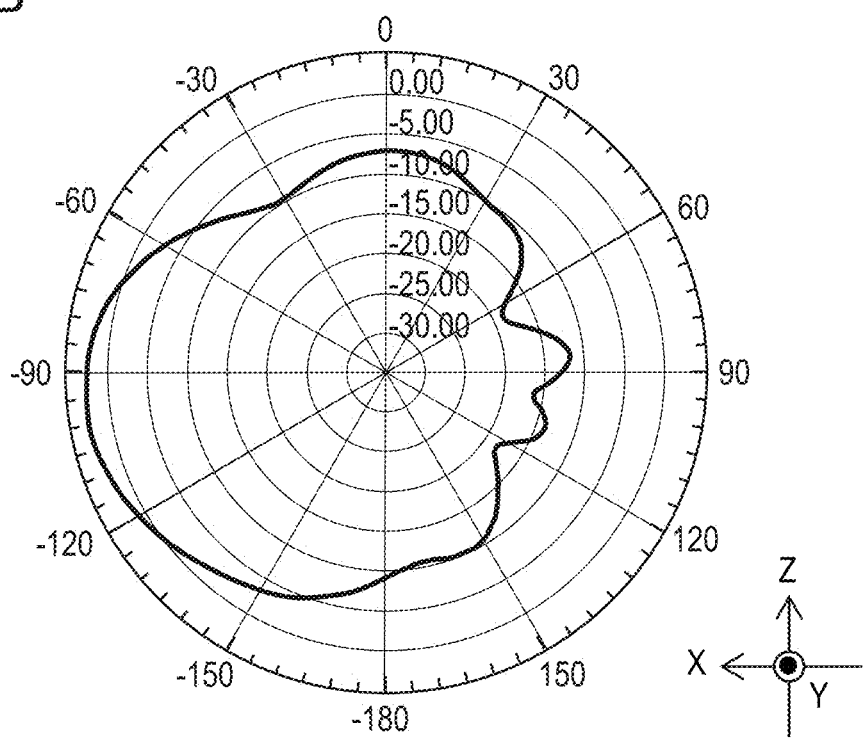
Figure 11C:
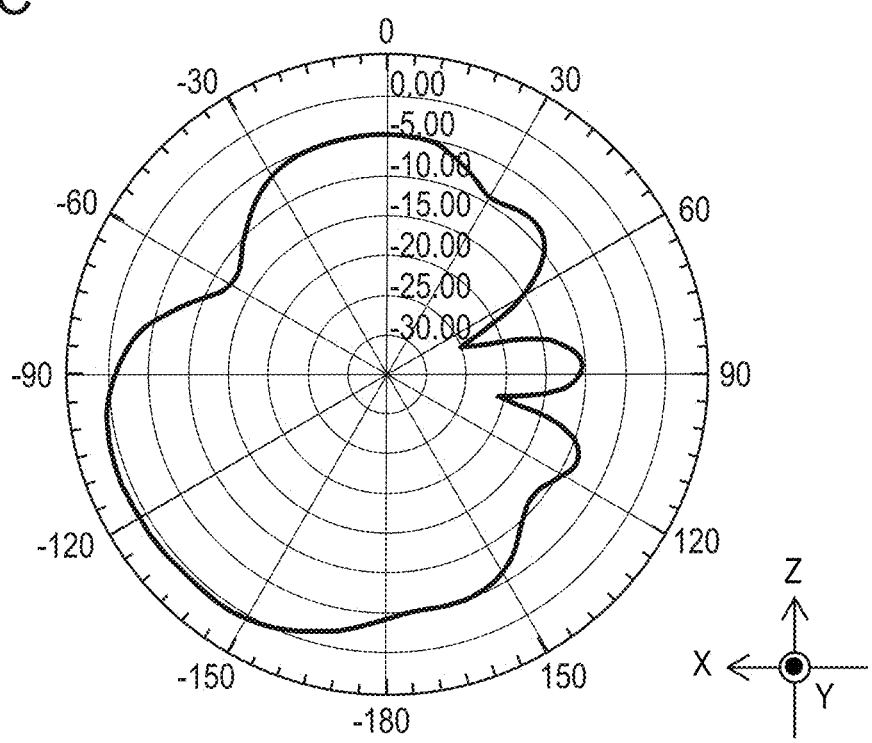

The radiation characteristics of the RFID reader 300 according to the first embodiment are simulated by using a model in which the arrangement of elements in the RFID reader 300 (FIGS. 8A to 8C) is faithfully reproduced. Referring to FIGS. 11A to 11C, the result of the simulation will be described. FIG. 11A overlappingly illustrates the outlines of the RFID reader 300 and a human body phantom in a polar coordinate system for representing a radiation pattern in order to represent the positional relationship among the coordinate axes in FIGS. 11B and 11C, the RFID reader 300, and the human body phantom. FIG. 11B illustrates a radiation pattern representing the result of simulation performed in a state in which the RFID reader 300 according to the first embodiment having the secondary radiator 303 is attached to the human body phantom. FIG. 11C illustrates, as a comparative example, a radiation pattern representing the result of simulation performed in a state in which the RFID reader 300 according to the first embodiment from which the secondary radiator 303 is removed is attached to the human body phantom. The simulation method is the same as that described in 1.10., except that the disposition of elements in the RFID reader 300 is different and that the shape of the human body phantom is not a rectangular parallelepiped (FIGS. 9A and 9B) but a shape simulating the upper body of an adult male (FIGS. 2A and 2B).

By comparing FIGS. 11B and 11C, it can be understood that, with the RFID reader 300 according to the first embodiment having the secondary radiator 303, the gain on the front side (+X side, −90 degrees direction) is greater by 3 dB than a comparative example that does not have the secondary radiator 303. This means that, when the RFID reader whose radiation of an electromagnetic wave toward the back side (−X side) is increased by the secondary radiator 303 is attached to a human body, an electromagnetic wave is reflected by the human body, and, as a result, the gain on the front side (+X side) increases. That is, it can be understood that, compared with an RFID reader that does not have the secondary radiator 303, the RFID reader 300 having the secondary radiator 303 has a large gain on the front side (+X side) in an in-use state of being attached to a human body.

In the first embodiment, the secondary radiator 303 is disposed on the back side (−X side) in the X-axis direction with respect to the antenna elements 503 and 504 and the ground plane GND. In a state in which the RFID reader 300 is not attached to a human body phantom, the main lobe direction of the RFID reader 300 is toward the back side (−X side). In other words, in the present embodiment, the parasitic element is disposed on the first side in the first direction with respect to the antenna element and the ground plane. In a state in which the reading apparatus is not attached to an attachment target, the main lobe direction of the reading apparatus is a direction toward the first side (−X side) in the first direction. Therefore, in an in-use state in which the RFID reader 300 is attached to a human body, an electromagnetic wave is reflected by the human body, and thus the gain on the front side (+X side) becomes large compared with a comparative example that does not have the secondary radiator 303.

In this way, with the present embodiment, it is possible to provide a reading apparatus and a reading apparatus case that can suppress reduction of a communication range when attached to a human body or the like while enabling reduction in size.

Modifications

In the first embodiment, an arrangement example in which the driven antenna element 503 and the parasitic antenna element 504 are apart from the substrate 500 in the X-axis direction has been described. Instead of such an arrangement, for example, the contact pins 502 and 505 may be removed, and the driven antenna element 503 and the parasitic antenna element 504 may be formed as a print pattern (microstrip antenna) projected onto the substrate 500 in the X-axis direction. In this case, for example, the print pattern may be disposed on an upper part and a lower part of the substrate 500 as illustrated in FIG. 9A, and the open end side may face an end portion of the substrate 500.

In the first embodiment, a configuration such that the secondary radiator 303 is not electrically connected to the substrate 500 has been described.

Instead, a middle portion of the secondary radiator 303 and the vicinity of the feeder 501 of the substrate 500 may be electrically connected by using a spring contact (not shown) or the like. By doing so, an effect on the secondary radiator 303 from the outside can be reduced, and it is possible to further stabilize the electric field distribution when the secondary radiator 303 resonates. The middle portion of the secondary radiator 303 and the vicinity of the feeder 501 are electrically connected, because these are portions where the electric field intensity is stable during resonation.

In the first embodiment, the secondary radiator 303 (FIG. 13A) having an outer shape corresponding to the planar portion 301b of the case 301 when viewed in the X-axis direction has been described. The shape of the secondary radiator 303 is not limited to this. FIGS. 13B to 13F illustrate examples of other shapes of the secondary radiator 303. As illustrated in FIGS. 13B and 13C, the secondary radiator 303 may have s shape that is asymmetric in the Z-axis direction. As illustrated in FIG. 13D, the secondary radiator 303 may have an outer shape (here, an X-shape) other than a rectangular shape. As illustrated in FIGS. 13E and 13F, the secondary radiator 303 may be provided so as to cover some or all of the openings 302a to 302d of the case 301. In the examples illustrated in FIGS. 13B to 13F, the length of the secondary radiator 303 in the Z-axis direction is shorter than ½ of the wavelength of the operation frequency of the RFID reader 300. Each of the examples illustrated in FIGS. 13B to 13F has an advantageous effect of improving the communication range in an in-use state of being attached to a human body, compared with a case where the secondary radiator 303 is not provided in the case 301.

The advantageous effect of improving the communication range tends to increase as the length of the secondary radiator 303 in the Z-axis direction increases. The reason for this is as follows. If the long-side length of the secondary radiator 303 is short, performance as a patch antenna decreases, and the gain on the back side (−X side) decreases in an unused state of not being attached to a human body. As a result, in an in-use state of being attached to a human body, an electromagnetic wave reflected toward the front side (+X side) by the human body weakens. The length of the secondary radiator 303 in the Z-axis direction may be, for example, longer than or equal to ¼ of the wavelength of the operation frequency of the RFID reader 300.

The advantageous effect of improving the communication range tends to increase as the area of the secondary radiator 303 increases. The reason for this is that, because the secondary radiator 303 resonates by receiving energy from an electric field generated by a primary radiator, the secondary radiator 303 can more easily resonate as the area of the secondary radiator 303 increases. The area of the secondary radiator 303 may be, for example, greater than or equal to 50% of the area of the substrate 500 viewed in the X-axis direction. The area of the secondary radiator 303 may be, for example, greater than or equal to 50% of the area of the case 301 viewed in the X-axis direction.

Figure 14:
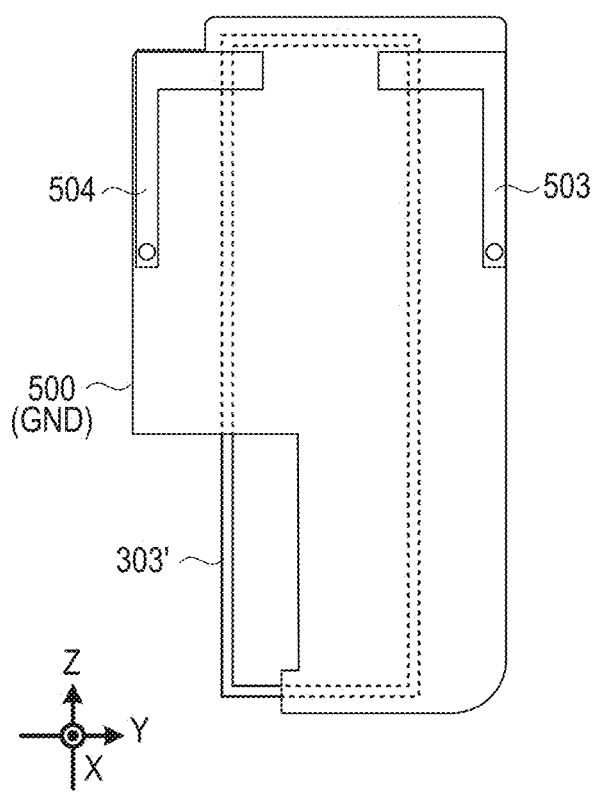
FIG. 14 illustrates a loop-shaped secondary radiator according to a modification.

In the first embodiment, an example in which the secondary radiator 303 has a substantially planar shape (substantially flat-plate-like shape) along the planar portion 301b of the case 301 has been described. This is not a limitation, and the secondary radiator 303 may have another shape that resonates at the operation frequency of the RFID reader 300. FIG. 14 illustrates a modification in which a loop-shaped secondary radiator 303' is used (corresponding to FIG. 8C). The perimeter of the loop-shaped secondary radiator 303' may be substantially equal to the wavelength of the operation frequency of the RFID reader 300.

As illustrated in FIG. 14, the loop-shaped secondary radiator 303' is disposed so as to overlap the substrate 500 when viewed in the X-axis direction. To be more specific, the loop-shaped secondary radiator 303' is disposed so as to overlap the ground plane GND, the driven antenna element 503, and the parasitic antenna element 504 when viewed in the X-axis direction. With such a configuration, it is possible to dispose the secondary radiator 303' by more effectively using the space in the housing of the RFID reader 300.

In the first embodiment, a configuration such that the direction of the main lobe is toward the front side (+X side) of the RFID reader 300 in an in-use state in which the RFID reader 300 is attached to a human body (FIG. 11B) has been described. This is not a limitation, and the radiation characteristics of the RFID reader 300 can be changed in accordance with the purpose of use of the RFID reader 300, the way of using the RFID reader 300, and the specific configuration of the RFID system. For example, if it is clear, from the purpose of use and the way of using the RFID reader 300, that an obstacle is constantly present in a predetermined direction, the RFID reader 300 may have directivity such that the predetermined direction is a null point. If the posture of the RFID tag 101 is limited, the RFID reader 300 may have the radiation characteristics described in the first embodiment regarding one of horizontal polarization and vertical polarization.

Second Embodiment

Referring to FIGS. 12A and 12B, a reader body 100 according to a second embodiment will be described. Hereafter, elements having substantially the same configurations and effects as those the first embodiment will be denoted by the same reference numerals as in the first embodiment, and differences from the first embodiment will be mainly described.

FIG. 12A is a perspective view of components in the housing of the RFID reader 300 and a secondary radiator 306. FIG. 12B is a right-side view of the components in the housing of the RFID reader 300 and the secondary radiator 306. The positional relationship among the components in the housing of the RFID reader 300 and the secondary radiator 306 viewed from the front side is the same as that of FIG. 8C except that the secondary radiator 306 is located at the foremost position, and thus illustration is omitted.

As illustrated in FIGS. 12A and 12B, in the second embodiment, the secondary radiator 306 is disposed on the front side (+X side) with respect to the substrate 500. The secondary radiator 306 is disposed on the front side (+X side) with respect to each of the ground plane GND of the substrate 500, the driven antenna element 503, and the parasitic antenna element 504.

When the driven antenna element 503 is excited by the circuit section 506 of the substrate 500, the parasitic antenna element 504 resonates, and the driven antenna element 503 and the parasitic antenna element 504 radiate an electromagnetic wave. The ground plane GND has a function as an antenna element that radiates an electromagnetic wave together with the driven antenna element 503 and the parasitic antenna element 504 due to a mirror-image effect. That is, the driven antenna element 503, the parasitic antenna element 504, and the ground plane GND function as a primary radiator that radiates an electromagnetic wave in the housing of the RFID reader 300.

Although the secondary radiator 306 is not electrically connected to the circuit section 506 of the substrate 500, the secondary radiator 306 functions as a new radiation source (parasitic element) by resonating with the primary radiator. The secondary radiator 306 according to the present embodiment increases the gain toward the front side (+X side) of the RFID reader 300, compared with a case where the secondary radiator 306 is not present, with reference to a state of not being attached to a human body.

As described above, the RFID reader 300 is used in a state of being attached to a human body so that the back side (−X side) is close to the human body in the thickness direction (the X-axis direction) (FIGS. 2A and 2B).

In the present embodiment, since the gain toward the front side (+X side) of the RFID reader 300 increases due to the secondary radiator 306, an effect of a human body is reduced even when the human body becomes close to the back side (−X side).

Also in the present embodiment, the length L of the secondary radiator 306 in the Z-axis direction (second direction), which is the long-side direction of the RFID reader 300, is shorter than ½ of the wavelength of the operation frequency of the RFID reader 300. While using the secondary radiator 303 having such a small size, it is possible to increase the gain on the front side (+X side) in an in-use state of being attached to a human body or the like due to the secondary radiator 303.

That is, with the present embodiment, it is possible to provide a reading apparatus and a reading apparatus case that can suppress reduction of a communication range when attached to a human body or the like while enabling reduction in size.

In the second embodiment, the secondary radiator 306 is disposed on the front side (+X side) in the X-axis direction with respect to the antenna elements 503 and 504 and the ground plane GND. In a state in which the RFID reader 300 is not attached to a human body phantom, the main lobe direction of the RFID reader 300 is toward the front side (+X side). In other words, in the present embodiment, the parasitic element is disposed on a side opposite from the first side in the first direction with respect to the antenna element and the ground plane. In a state in which the reading apparatus is not attached to an attachment target, the main lobe direction of the reading apparatus is a direction toward a side opposite from the first side (+X side) in the first direction. Therefore, in an in-use state in which the RFID reader 300 is attached to a human body, the gain on the front side (+X side) is large compared with a comparative example that does not have the secondary radiator 306.

The secondary radiator 306 and the ground plane GND of the substrate 500 may have substantially the same shape when viewed in the X-axis direction. For example, the secondary radiator 306 and the ground plane GND each may have a shape having a length in the Z-axis direction (the long-side direction of the RFID reader 300) that is longer than a length in the Y-axis direction (the short-side direction of the RFID reader 300) when viewed in the X-axis direction.

Thus, it is possible to cause the secondary radiator 306 to resonate more efficiently. It is possible to dispose the secondary radiator 306 and the ground plane GND by more effectively using the space in the housing of the RFID reader 300.

The long-side length (length in the Z-axis direction) of the ground plane GND and the long-side length L of the secondary radiator 306 each may be shorter than ½ of the wavelength of the operation frequency of the RFID reader 300. Thus, it is possible to dispose the ground plane GND and the secondary radiator 306 by more effectively using the space in the housing of the RFID reader 300.

At least a part of the ground plane GND and at least a part of the secondary radiator 306 may be parallel to each other. Thus, it is possible to cause the secondary radiator 306 to resonate more efficiently.

The resonant mode of the secondary radiator 306 differs from the resonant mode of the ground plane GND of the substrate 500. The secondary radiator 306 functions as a patch antenna. In other words, when the antenna elements 503 and 504 are excited, the secondary radiator 306 exhibits an electric field distribution such that the electric field intensity is the maximum at both end portions in the long-side direction (Z-axis direction) and the electric field intensity is the minimum at a middle portion in the long-side direction (Z-axis direction). On the other hand, the ground plane GND serves as an equipotential surface for forming a mirror image of the driven antenna element 503 and the parasitic antenna element 504.

As described in the modification of the first embodiment, the driven antenna element 503 and the parasitic antenna element 504 may be formed as a print pattern (microstrip antenna) on the substrate 500. A middle portion of the secondary radiator 306 and the vicinity of the feeder 501 of the substrate 500 may be electrically connected by using a spring contact (not shown) or the like. The shape of the secondary radiator 306 when viewed in the X-axis direction may be, for example, any of those illustrated in FIGS. 13B to 13F. Instead of the secondary radiator 306 having a substantially planar shape (substantially flat-plate-like shape), a loop-shaped secondary radiator (see FIG. 14) may be used.

As still another modification, the secondary radiator 303 on the back side (−X side) with respect to the substrate 500 described in the first embodiment and the secondary radiator 306 on the front side (+X side) with respect to the substrate 500 described in the second embodiment may be used in combination. Thus, since an electromagnetic wave radiated on the back side (−X side) is reflected by a human body, in an in-use state of being attached to a human body, it is possible to further increase the gain on the front side (+X side) compared with the second embodiment. The secondary radiator 306 on the front side (+X side) and the secondary radiator 303 on the back side (−X side) may be provided in the same case that covers the back side (−X side) and the front side (+X side) of the reader body 100.

Other Embodiments

In the embodiments and the modifications described above, examples in which the housing of the RFID reader 300 is constituted by the body case 100C and the case 301 (outer case), and the body case 100C is attachable to and removable from the case 301 has been described. This is not a limitation, and the body case 100C may be fixed to the case 301. Instead of the configuration such that the secondary radiator is disposed in the case 301, the secondary radiator may be disposed in the front cover 100a or the back cover 100b of the body case 100C. In this case, the reader body 100 that does not have the case 301 can be independently used as an RFID reader.

Summary of Present Disclosure

The present disclosure includes at least the following configurations.

Configuration 1

A reading apparatus comprising:

an antenna element;

a substrate including a ground plane that serves as a reference potential of the antenna element and a communication circuit that transmits and receives a radio signal to and from an RFID tag via the antenna element; and a housing that holds the antenna element and the substrate, wherein the housing has a plate-like shape having a length in a first direction that is shorter than a length in a second direction and a length in a third direction, where the first direction is a thickness direction of the substrate, the second direction is a long-side direction of the housing when viewed in the first direction, and the third direction is a short-side direction of the housing when viewed in the first direction, wherein the reading apparatus includes a parasitic element that is disposed apart from the substrate in the first direction and is disposed so as to overlap both of the antenna element and the ground plane when viewed in the first direction, the parasitic element resonating when the antenna element is excited, and wherein a length of the parasitic element in the second direction is shorter than ½ of a wavelength of an operation frequency that is used to transmit and receive the radio signal.

Configuration 2

The reading apparatus according to Configuration 1,
wherein a length of the ground plane in the second direction is shorter than ½ of the wavelength.

Configuration 3

The reading apparatus according to Configuration 1 or 2,
wherein the length of the parasitic element in the second direction is longer than or equal to ¼ of the wavelength.

Configuration 4

The reading apparatus according to any one of Configurations 1 to 3,
wherein the parasitic element has a plate-like shape intersecting the first direction.

Configuration 5

The reading apparatus according to Configuration 4,
wherein an area of the parasitic element when viewed in the first direction is greater than or equal to ½ of an area of the substrate.

Configuration 6

The reading apparatus according to Configuration 4 or 5,
wherein the parasitic element is configured to exhibit an electric field distribution such that an electric field intensity at an end portion of the parasitic element in the second direction is maximum when the antenna element is excited.

Configuration 7

The reading apparatus according to any one of Configurations 1 to 3
wherein the parasitic element is loop-shaped.

Configuration 8

The reading apparatus according to any one of Configurations 1 to 7,
wherein a distance between the substrate and the parasitic element in the first direction is longer than or equal to $\frac{1}{60}$ of the wavelength and shorter than or equal to ¼ of the wavelength.

Configuration 9

The reading apparatus according to any one of Configurations 1 to 8,
wherein the ground plane is disposed between the antenna element and the parasitic element in the first direction, and
wherein the parasitic element overlaps each of the antenna element and the ground plane when viewed in the first direction.

Configuration 10

The reading apparatus according to any one of Configurations 1 to 9,
wherein the housing has a first outer surface that is an outer surface of the housing on a first side in the first direction, and
wherein the reading apparatus is configured to be attached to an attachment target in a state in which the first outer surface faces the attachment target.

Configuration 11

The reading apparatus according to any one of Configurations 1 to 9,
wherein the housing has a first outer surface that is an outer surface of the housing on a first side in the first direction, and
wherein the housing has an opening for allowing the reading apparatus to be attached to an attachment target in a state in which the first outer surface faces the attachment target.

Configuration 12

The reading apparatus according to any one of Configurations 1 to 9, further comprising:
an operation unit configured to operate the reading apparatus,
wherein the housing has a first outer surface that is an outer surface of the housing on a first side in the first direction and a second outer surface that is an outer surface on a second side opposite from the first side in the first direction, and
wherein the operation unit is exposed on the second outer surface.

Configuration 13

The reading apparatus according to any one of Configurations 1 to 9, further comprising:
a display unit configured to display a state of the reading apparatus,
wherein the housing has a first outer surface that is an outer surface of the housing on a first side in the first direction and a second outer surface that is an outer surface on a second side opposite from the first side in the first direction, and
wherein the display unit is exposed on the second outer surface.

Configuration 14

The reading apparatus according to any one of Configurations 10 to 13,
wherein the parasitic element is disposed on the first side in the first direction with respect to the antenna element and the ground plane, and
wherein, in a state in which the reading apparatus is not attached to an attachment target, a main lobe direction of the reading apparatus is a direction toward the first side in the first direction.

Configuration 15

The reading apparatus according to any one of Configurations 10 to 13,
wherein the parasitic element is disposed on a side opposite from the first side in the first direction with respect to the antenna element and the ground plane, and

wherein, in a state in which the reading apparatus is not attached to an attachment target, a main lobe direction of the reading apparatus is a direction toward a side opposite from the first side in the first direction.

Configuration 16

The reading apparatus according to any one of Configurations 10 to 13,
wherein the housing includes a body case that covers the substrate from both sides in the first direction and a case member that covers the body case from the first side in the first direction and that forms the first outer surface, and
wherein the parasitic element is provided in the case member.

Configuration 17

The reading apparatus according to Configuration 16,
wherein a space is formed between the body case and the case member in the first direction.

Configuration 18

The reading apparatus according to Configuration 16 or 17,
wherein the body case is attachable to and removable from the case member.

Configuration 19

The reading apparatus according to any one of Configurations 1 to 6 and 8 to 13,
wherein the housing includes a case member that forms an outer surface of the housing,
wherein the case member has a first opening and a second opening for attaching the reading apparatus to an attachment target, the first opening and the second opening being arranged in the second direction,
wherein the parasitic element has a plate-like shape extending in a direction intersecting the first direction and is provided in the case member,
wherein an end portion of the parasitic element in the second direction extends to a position that overlaps an opening range of the first opening in the second direction at a position that is different from the first opening in the third direction, and
wherein the length of the parasitic element in the second direction is longer than a distance between the first opening and the second opening in the second direction.

Configuration 20

A reading apparatus case for attaching a reading apparatus body,
the reading apparatus body including
an antenna element,
a substrate including a ground plane that serves as a reference potential of the antenna element and a communication circuit that transmits and receives a radio signal to and from an RFID tag via the antenna element, and
a body case that accommodates the substrate,
wherein the body case has a plate-like shape having a length in a first direction that is shorter than a length in a second direction and a length in a third direction, where the first direction is a thickness direction of the substrate, the second direction is a long-side direction of the body case when viewed in the first direction, and the third direction is a short-side direction of the body case when viewed in the first direction,
the reading apparatus case comprising:
a parasitic element that is disposed apart from the substrate in the first direction and is disposed so as to overlap both of the antenna element and the ground plane when viewed in the first direction, the parasitic element resonating when the antenna element is excited,
wherein a length of the parasitic element in the second direction is shorter than ½ of a wavelength of an operation frequency that is used to transmit and receive the radio signal.

With the present invention, it is possible to provide a reading apparatus and a reading apparatus case that can suppress reduction of a communication range in an in-use state while enabling reduction in size.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2023-150108, filed Sep. 15, 2023, which is hereby incorporated by reference herein in its entirety.

What is claimed is:

1. A reading apparatus comprising:
an antenna element;
a substrate including a ground plane that serves as a reference potential of the antenna element and a communication circuit that transmits and receives a radio signal to and from an RFID tag via the antenna element; and
a housing that holds the antenna element and the substrate,
wherein the housing has a plate-like shape having a length in a first direction that is shorter than a length in a second direction and a length in a third direction, where the first direction is a thickness direction of the substrate, the second direction is a long-side direction of the housing when viewed in the first direction, and the third direction is a short-side direction of the housing when viewed in the first direction,
wherein the reading apparatus includes a parasitic element that is disposed apart from the substrate in the first direction and is disposed so as to overlap both of the antenna element and the ground plane when viewed in the first direction, the parasitic element resonating when the antenna element is excited,
wherein a length of the parasitic element in the second direction is shorter than ½ of a wavelength of an operation frequency that is used to transmit and receive the radio signal and is longer than or equal to ¼ of the wavelength.

2. The reading apparatus according to claim 1,
wherein a length of the ground plane in the second direction is shorter than ½ of the wavelength.

3. The reading apparatus according to claim 1,
wherein the parasitic element has a plate-like shape intersecting the first direction.

4. The reading apparatus according to claim 3,
wherein an area of the parasitic element when viewed in the first direction is greater than or equal to ½ of an area of the substrate.

5. The reading apparatus according to claim 3,
wherein the parasitic element is configured to exhibit an electric field distribution such that an electric field intensity at an end portion of the parasitic element in the second direction is maximum when the antenna element is excited.

6. The reading apparatus according to claim 1,
wherein the parasitic element is loop-shaped.

7. The reading apparatus according to claim 1,
wherein a distance between the substrate and the parasitic element in the first direction is longer than or equal to ¹⁄₆₀ of the wavelength and shorter than or equal to ¼ of the wavelength.

8. The reading apparatus according to claim 1,
wherein the ground plane is disposed between the antenna element and the parasitic element in the first direction, and
wherein the parasitic element overlaps each of the antenna element and the ground plane when viewed in the first direction.

9. The reading apparatus according to claim 1,
wherein the housing has a first outer surface that is an outer surface of the housing on a first side in the first direction, and
wherein the reading apparatus is configured to be attached to an attachment target in a state in which the first outer surface faces the attachment target.

10. The reading apparatus according to claim 9,
wherein the parasitic element is disposed on the first side in the first direction with respect to the antenna element and the ground plane, and
wherein, in a state in which the reading apparatus is not attached to an attachment target, a main lobe direction of the reading apparatus is a direction toward the first side in the first direction.

11. The reading apparatus according to claim 9,
wherein the parasitic element is disposed on a side opposite from the first side in the first direction with respect to the antenna element and the ground plane, and
wherein, in a state in which the reading apparatus is not attached to an attachment target, a main lobe direction of the reading apparatus is a direction toward a side opposite from the first side in the first direction.

12. The reading apparatus according to claim 9,
wherein the housing includes a body case that covers the substrate from both sides in the first direction and a case member that covers the body case from the first side in the first direction and that forms the first outer surface, and
wherein the parasitic element is provided in the case member.

13. The reading apparatus according to claim 12,
wherein a space is formed between the body case and the case member in the first direction.

14. The reading apparatus according to claim 12,
wherein the body case is attachable to and removable from the case member.

15. The reading apparatus according to claim 1,
wherein the housing has a first outer surface that is an outer surface of the housing on a first side in the first direction, and
wherein the housing has an opening for allowing the reading apparatus to be attached to an attachment target in a state in which the first outer surface faces the attachment target.

16. The reading apparatus according to claim 1, further comprising:
an operation unit configured to operate the reading apparatus,
wherein the housing has a first outer surface that is an outer surface of the housing on a first side in the first direction and a second outer surface that is an outer surface on a second side opposite from the first side in the first direction, and
wherein the operation unit is exposed on the second outer surface.

17. The reading apparatus according to claim 1, further comprising:
a display unit configured to display a state of the reading apparatus,
wherein the housing has a first outer surface that is an outer surface of the housing on a first side in the first direction and a second outer surface that is an outer surface on a second side opposite from the first side in the first direction, and
wherein the display unit is exposed on the second outer surface.

18. The reading apparatus according to claim 1,
wherein the housing includes a case member that forms an outer surface of the housing,
wherein the case member has a first opening and a second opening for attaching the reading apparatus to an attachment target, the first opening and the second opening being arranged in the second direction,
wherein the parasitic element has a plate-like shape extending in a direction intersecting the first direction and is provided in the case member,
wherein an end portion of the parasitic element in the second direction extends to a position that overlaps an opening range of the first opening in the second direction at a position that is different from the first opening in the third direction, and
wherein the length of the parasitic element in the second direction is longer than a distance between the first opening and the second opening in the second direction.

19. A reading apparatus case for attaching a reading apparatus body,
the reading apparatus body including
an antenna element,
a substrate including a ground plane that serves as a reference potential of the antenna element and a communication circuit that transmits and receives a radio signal to and from an RFID tag via the antenna element, and
a body case that accommodates the substrate,
wherein the body case has a plate-like shape having a length in a first direction that is shorter than a length in a second direction and a length in a third direction, where the first direction is a thickness direction of the substrate, the second direction is a long-side direction of the body case when viewed in the first direction, and the third direction is a short-side direction of the body case when viewed in the first direction,
the reading apparatus case comprising:
a parasitic element that is disposed apart from the substrate in the first direction and is disposed so as to overlap both of the antenna element and the ground plane when viewed in the first direction, the parasitic element resonating when the antenna element is excited, wherein a length of the parasitic element in the second direction is shorter than ½ of a wavelength of an operation frequency that is used to transmit and receive the radio signal and is longer than or equal to ¼ of the wavelength.

* * * * *